US008005759B2

(12) United States Patent
Hirtenstein et al.

(10) Patent No.: US 8,005,759 B2
(45) Date of Patent: Aug. 23, 2011

(54) SYSTEM AND METHOD FOR PROVIDING A SCORE FOR A USED VEHICLE

(75) Inventors: Edith Hirtenstein, Chicago, IL (US); David Nemtuda, Algonquin, IL (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 435 days.

(21) Appl. No.: 11/893,609

(22) Filed: Aug. 16, 2007

(65) Prior Publication Data

US 2008/0046383 A1 Feb. 21, 2008

Related U.S. Application Data

(60) Provisional application No. 60/838,468, filed on Aug. 17, 2006, provisional application No. 60/888,021, filed on Feb. 2, 2007, provisional application No. 60/949,808, filed on Jul. 13, 2007.

(51) Int. Cl.
*G06Q 10/00* (2006.01)
(52) U.S. Cl. ........................................................ 705/306
(58) Field of Classification Search .................. None
See application file for complete search history.

(56) References Cited

U.S. PATENT DOCUMENTS

| | | | |
|---|---|---|---|
| 5,819,234 A | 10/1998 | Slavin et al. | |
| 5,878,403 A | 3/1999 | DeFrancesco | |
| 6,182,048 B1 | 1/2001 | Osborn et al. | |
| 6,282,517 B1 | 8/2001 | Wolfe et al. | |
| 6,587,841 B1 | 7/2003 | DeFrancesco | |
| 6,772,145 B2 | 8/2004 | Shishido | |
| 7,050,982 B2 * | 5/2006 | Sheinson et al. | 705/1 |
| 7,092,898 B1 * | 8/2006 | Mattick et al. | 705/26 |
| 7,181,427 B1 | 2/2007 | DeFrancesco | |
| 7,184,974 B2 | 2/2007 | Shishido | |
| 7,228,298 B1 | 6/2007 | Raines | |
| 7,596,512 B1 | 9/2009 | Raines et al. | |
| 2002/0042752 A1 | 4/2002 | Chaves | |

(Continued)

FOREIGN PATENT DOCUMENTS

JP 09-251486 9/1997

(Continued)

OTHER PUBLICATIONS

"Consumer Reports", http://www.consumerreports.org/content/Pressroom/Presseng/PDF/eng0304rel.pdf.*

(Continued)

*Primary Examiner* — Rutao Wu
(74) *Attorney, Agent, or Firm* — Knobbe Martens Olson & Bear LLP

(57) ABSTRACT

One embodiment of the system and method described herein provides a score generator system that generates an automated vehicle specific valuation of a used car based on the physical and historical attributes of that vehicle. This score may indicate the likelihood that the vehicle will be on the road in a specific period of time. The score may give an absolute percentage of such likelihood or it may give a value relative to all other used vehicles in a database, all other used vehicles of the same make/model/year, or a certain subset of the vehicles in a database. In one embodiment, the score generator system includes a data link module for linking vehicle data and filter module for applying a multi-level filters that process the linked vehicle data.

11 Claims, 7 Drawing Sheets

U.S. PATENT DOCUMENTS

| | | | |
|---|---|---|---|
| 2002/0072964 | A1 | 6/2002 | Choi |
| 2002/0082978 | A1 | 6/2002 | Ghouri et al. |
| 2002/0091706 | A1 | 7/2002 | Anderson et al. |
| 2002/0099628 | A1 | 7/2002 | Takaoka et al. |
| 2002/0161496 | A1 | 10/2002 | Yamaki |
| 2003/0046179 | A1 | 3/2003 | Anabtawi et al. |
| 2003/0105728 | A1 | 6/2003 | Yano et al. |
| 2003/0200151 | A1* | 10/2003 | Ellenson et al. ............... 705/26 |
| 2004/0172266 | A1* | 9/2004 | Sheinson et al. ................. 705/1 |
| 2005/0113991 | A1 | 5/2005 | Rogers et al. |
| 2006/0229799 | A1 | 10/2006 | Nimmo et al. |

FOREIGN PATENT DOCUMENTS

| | | |
|---|---|---|
| JP | 10-222559 | 8/1998 |
| JP | 10-261009 | 9/1998 |
| JP | 2000-331068 | 11/2000 |
| JP | 2001-297141 | 10/2001 |
| JP | 2001-344463 | 12/2001 |
| JP | 2001-357256 | 12/2001 |
| JP | 2002-149778 | 5/2002 |
| JP | 2002-163498 | 6/2002 |
| JP | 2002-259753 | 9/2002 |
| JP | 2003-271851 | 9/2003 |
| JP | 2003-316881 | 11/2003 |
| KR | 10-2000-0036594 | 7/2000 |
| KR | 10-2000-063995 | 11/2000 |
| KR | 10-2001-0016349 | 3/2001 |
| KR | 10-2001-0035145 | 5/2001 |
| KR | 10-2002-0007132 | 1/2002 |
| KR | 10-2002-0068866 | 8/2002 |
| WO | WO 01/71458 A2 | 9/2001 |

OTHER PUBLICATIONS

"Consumer Reports", http://www.consumerreports.org/content/Pressroom/Presseng/PDF/eng0304rel.pdf, Apr. 2003.*

International Search Report for Application No. PCT/US07/76152, dated Mar. 20, 2009, in 9 pages.

Watts, Craig, "Consumers Now Can Know What Loan Rate Offers to Expect Based on Their FICO Credit Score at MyFICO.com", Mar. 6, 2002, http://www.myfico.com/PressRoom/PressReleases/2002_03_06.aspx, in 2 pages.

Autobytel.com, dated Aug. 6, 2004 as printed from the Wayback Machine at http://web.archive.org/web/20040806010507//http://autobytel.com/, in 3 pages.

Checkbook.org, dated Jun. 4, 2004 as printed from the Wayback Machine at http://web.archive.org/web/20040604192834/www.checkbook.org/auto/carbarg.cfm, in 1 page.

Carsdirect.com, dated Jul. 30, 2004 as printed from the Wayback Machine at http://web.archive.org/web/20040730142836/www.carsdirect.com/home, in 2 pages.

Invoicedealers.com, dated Aug. 4, 2004 as printed from the Wayback Machine at http://web.archive.org/web/20040804044511/http://www.invoicedealers.com/, in 2 pages.

Cars.com, dated Oct. 10, 2004 as printed from the Wayback Machine at http://web.archive.org/web/20041010081241/www.cars.com/go/index.jsp?aff=national, in 2 pages.

Bankrate.com, dated Aug. 9, 2004 as printed from the Wayback Machine at http://web.archive.org/web/20040809000026/www.bankrate.com/brm/default.asp, in 3 pages.

"Experian Uses SSA-NAME3 to Match 40 to 50 Million Transactions per Month Against an 11.5 Billion Row Database", DM Review, www.dmreview.com, Apr. 2001, vol. 11, No. 4, in 3 pages.

Sawyers, "NADA to offer residual guide". Automotive News, May 22, 2000 p. 3.

Miller, "NADA used-car prices go online". Automotive News, Jun. 14, 1999 p. 36.

"Japan's JAAI system appraises used cars over internet", Asia Pulse Mar. 3, 2000.

"WashingtonPost.com and Cars.com launch comprehensive automotive web site for the Washington area". PR Newswire, Oct. 22, 1998.

"Cars.com helps consumers find high value used cars; Free online service provides consumers with the information required to determine the value of a specific used car and locate it at a dealership close to home". PR Newswire Oct. 13, 1998.

"Yahoo! Autos provides enhanced road map for researching buying and selling cars online". PR Newswire, Oct. 13, 1998.

AutoConnect partners with Organic to Build world's most comprehensive online emporium of pre-owned vehicles. PR Newswire, May 19, 1998.

"Stoneage Corporation announces database of 250,000 used cars posted to the internet". PR Newswire, Feb. 24, 1998.

"Web sites let automotive consumers arm themselves with price information". Orange County Register, Nov. 14, 1997.

Choudhury, "Uses and consequences of electronic markets: An empirical investigation in the aircraft parts industry". MIS Quarterly, Dec. 1998.

"Aucnet: Electronic intermediary for used-car transactions". Electronic Markets, vol. 7-No. 4, 1997, pp. 24-28.

"Carfax Teams with Esurance", PR Newswire, May 14, 2001.

Koller, "Wireless Service Aids Car Buyers", InternetWeek, p. 15, Jul. 9, 2001.

"Driveitaway.com Links with AutoCheck to Provide Car Shoppers Vehicle Histories", PR Newswire, Jan. 15, 2001.

"Appraisal Tool", VAuto Live Market View; http://www.vauto.com/vAuto_solution/appraisal.asp, 3 pages, Feb. 4, 2010.

"Pricing Tool", VAuto Live Market View; http://www.avauto.com/vAuto_Solution/pricing.asp, 2pages, Feb. 4, 2010.

"Power to Drive your Business", J.D. Power and Associates Power Information Network; http://www.powerinfonet.com/products/productDetail.asp?type=financialinstitutions, 2 pages, Feb. 4, 2010.

"NAAA-Recommended Vehicle Condition Grading Scale", 3 pages, Feb. 4, 2010.

"Urban Science Launches Second Generation Lead Scoring Solution", Urban Science; Mar. 1, 2007, http://www.urbanscience.com/newsevents/pr_20070222.html, 3 pages.

"Intelligence Insight Impact", Polk Automotive Manufacturers; http://usa.polk.com/Industries/AutoMfr/Analyze/MarketAnalysis/, 3 pages, Feb. 4, 2010.

* cited by examiner

AutoCheck VehicleScore™

| AutoCheckFactor | Low | Medium | High |
|---|---|---|---|
| AutoCheck VINCloneCheck<br>Rating from AutoCheck VINCloneCheck.<br>Detailed information is below. | Low VIN Clone risk found | | |
| AutoCheck ValueCheck<br>Based on the other risk factors, the value of the vehicle can be reduced or increased | | 10% value reduction | |
| AutoCheck SameVehicleScore<br>This vehicle compared to similar vehicles that are the same make/model and year | 7.5 | | |

AutoCheck VehicleScore
This vehicle compared to all vehicles. Check the AutoCheck SameVehicleScore for comparison to cars that are like this one.

| | | 6.3 | |
|---|---|---|---|

SYSTEM AND METHOD FOR PROVIDING A SCORE FOR A USED VEHICLE

RELATED APPLICATIONS

This application claims priority to U.S. Provisional Application No. 60/838,468 filed Aug. 17, 2006; U.S. Provisional Application No. 60/888,021 filed Feb. 2, 2007; and U.S. Provisional Application No. 60/949,808 filed Jul. 13, 2007, each titled "System and Method for Providing a Score for a Used Vehicle;" the contents of these three applications are hereby incorporated by reference in their entirety.

COPYRIGHT NOTICE

A portion of the disclosure of this patent document contains material which is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

BACKGROUND

1. Field of the Disclosure

This disclosure relates generally to automated vehicle analysis systems for grading and analyzing used vehicles.

2. Description of the Related Art

Buying a car can often be a difficult proposition. It is typically one of the more expensive purchases that people make. There are many different cars available, each having slightly different features, and prospective purchasers have numerous factors to take into account. The car buying process is often only exacerbated when purchasing a used car. There are few standards available to determine the quality of used cars and to determine whether the price is reasonable. It is therefore often difficult to accurately compare different used cars, both between two or more cars having similar or identical make, model, and year as well as among all used cars.

One information source that attempts to classify the relative values of cars is the Kelley Blue Book®. This guide attempts to give approximate pricing values to used cars based on their make, model, year, and some other features. This can often be an imprecise guide, however, because the condition of the vehicle is often estimated and specific occurrences in the life of a given vehicle are not taken into account.

Vehicle history reports can be used to determine more precise information about a specific vehicle, but often these reports provide a wealth of data without providing an overall picture of what that data means. Comparisons of multiple vehicle history reports can be a time-consuming process—the wealth of data may necessitate time to do a line-by-line comparison and may be difficult to even judge just how different line-items affect the quality or term of life of the different cars.

SUMMARY

As such, there is a need for a system and method to help provide a potential buyer with a quick determination of how various used cars compare to each other. The present disclosure provides a system for automated vehicle analysis and a method for providing a potential buyer or other user with, in an embodiment, a numerical vehicle score. In an embodiment, the vehicle score provides a relative ranking of a specific used car versus all used cars. In another embodiment, the vehicle score provides a relative ranking of a specific car versus other used cars of the same make, model, and/or year, while yet another score may relate to a given class of vehicles (such as SUVs, luxury sedans, trucks, economy cars, and the like). In another embodiment, the vehicle score provides an absolute score, rather than a relative one. This may correspond to a probability that a car will be on the road in five, seven, ten years, or the like. In another embodiment, the vehicle score is a determinant on the vehicle valuation as published by guide companies such as Kelley Blue Book and NADA Used Car Guides. In yet another embodiment, the vehicle score can be calculated from the time the vehicle is first sold to the present day. For instance, a vehicle score for a five year old vehicle can be calculated one time for each year of the vehicle's life, so that multiple scores steadily or rapidly decline based on the reported vehicle's history. Additionally, this same vehicle's score can also be projected into the future, showing, for example, how a vehicle's score may further decline over five years. In an embodiment, this may be based on the vehicle's current mileage, recent usage factors and the like.

One aspect of the present disclosure provides a vehicle scoring method, including electronically receiving a vehicle identification, from a user; retrieving a set of vehicle records from at least one data source; linking vehicle records that correspond to a common vehicle; identifying a set of vehicle factors from the linked vehicle records based on a first set of filter criteria; providing weighted values for each factor in the set based on a second set of filter criteria; combining the weighted values into a vehicle score; and electronically providing the score to the user system. Another aspect of the disclosure provides a method of vehicle scoring that includes: accepting a vehicle identification indicative of a vehicle; retrieving attributes associated with the vehicle; assigning values to the attributes relative to average values for a universe of vehicles; weighting the assigned values; and determining an overall score. In one embodiment, the vehicle scoring method is specifically tailored to pre-owned vehicles and includes attributes relating to the vehicle's history.

Another aspect of the present disclosure provides a vehicle scoring system that includes: a computer system having a processor that supports operation of a software application; a data storage module that includes a number of vehicle data records and can communicate with the computer system; a filter module including three filters—one for extracting relevant vehicle-related data from the data storage module, a second for valuing the relevant vehicle-related data, and a third for combining the values into a vehicle score; and an output module for reporting the vehicle score to a user. In an embodiment, the computer system is capable of accepting a vehicle identifier and communicating the identifier to the filter module for use in one or more of the filters. Yet another aspect of the present disclosure provides a system for generating a vehicle score. The system includes one or more databases of vehicle information such as physical attributes and historical data regarding specific vehicles. The system also includes a score generating module capable of assigning values to vehicle attributes, weighting the assigned values, and combining the weighted values in an overall score. In one embodiment, the system evaluates each of a number of attributes of a specified vehicle against the same attributes of other vehicles and assigns a value to each attribute or set of attributes; typically this will be a numerical value. These values are weighted depending on which factors have more or less effect on a vehicle's life expectancy, future monetary value, or the like, and a final score is then determined by merging the weighted factors. In one embodiment, the system also includes a network interface module and/or is associated with a web server, allowing a user to access the internet, browse to a web site, enter a vehicle identifier, and have the score displayed on a web site.

In an embodiment, a system in accordance with the disclosure gathers a large amount of data from a number of different databases and data sources. This data can be linked to provide overall pictures of individual vehicle histories. Due to the large amount of data, in an embodiment, when determining a vehicle score, a first filter is applied to restrict the data to that which is deemed relevant to the scoring process. A second layer filter can also be applied to translate the relevant data to numerical or other easily scored values. A third layer filter can also be applied to provide weighted values, and a final filter can be applied to combine each weighted value into an overall score. Different combinations and sets of filters may be used to provide scores for individual vehicles (1) versus all others; (2) versus similar classes, makes, and/or models; (3) versus similar model years; and the like.

For purposes of summarizing this disclosure, certain aspects, advantages and novel features of the disclosure have been described herein. Of course, it is to be understood that not necessarily all such aspects, advantages or features will be embodied in any particular embodiment of the disclosure.

BRIEF DESCRIPTION OF THE DRAWINGS

A general architecture that implements the various features of the disclosure will now be described with reference to the drawings. The drawings and the associated descriptions are provided to illustrate embodiments of the disclosure and not to limit its scope. Throughout the drawings, reference numbers are reused to indicate correspondence between referenced elements.

FIG. 4 illustrates a sample output box displaying scores in accordance with an embodiment of the present disclosure.

DETAILED DESCRIPTION OF PREFERRED EMBODIMENTS

Figure 1:
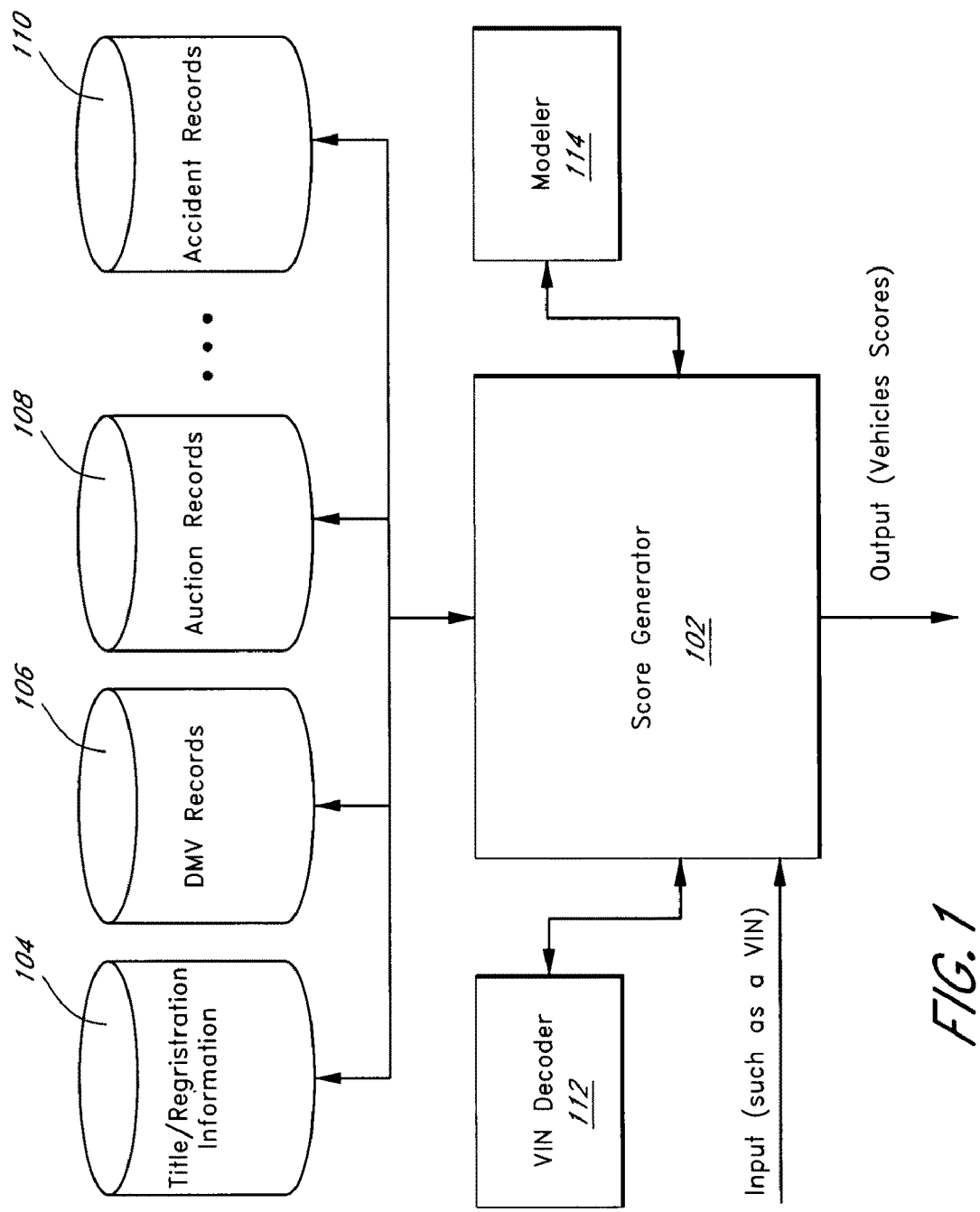
FIG. 1 illustrates a block diagram of an embodiment of a system for generating a vehicle score.

In one embodiment, an automated vehicle analysis system receives data from one or more databases that store vehicle information, and applies a multi-layer set of filters to the data to generate a vehicle score for a used automobile. The vehicle score is preferably simple in its presentation. In an embodiment, the multi-layered filters filter data using various factors such as, for example, vehicle age, mileage, location of use, number of owners, and number and type of accidents reported to determine a numerical value representative of the overall characteristics of a vehicle. In one embodiment, this score may represent the likelihood that a car will still be on the road in five years, for example. In one embodiment, a single vehicle may receive two sets of numerical scores—one set defining its position with respect to all makes and models, and the second defining its position with respect to same make/model/year vehicles.

In this way, for example, a 2002 Lexus ES having had several owners and high mileage may score well in general, but may be in the lower half when compared to all other 2002 Lexus ES vehicles. Conversely, a 1993 Nissan Sentra with relatively low mileage and one owner may score poorly in general, but well against all other 1993 Nissan Sentras that are still on the road.

The automated vehicle analysis system and methods go well beyond presenting facts about a given vehicle and instead automatically interpret the voluminous amounts of data to quickly deliver helpful decision information to a user in a generally easily understood format.

In an embodiment, the scores may represent a relative probability that a specific car will remain on the road in five (5) years compared to all vehicles and those of the same make/model/year. In other embodiments, the score or scores may represent an actual percent probability that a given car will be on the road in a specific number of months or years.

Various embodiments and examples of the systems and methods for scoring a vehicle will now be described with reference to the drawings. Like numbers indicate corresponding parts among the drawings and the leading digit represents the figure in which such part was first shown.

Example Score

Before delving into the details of the system and method, it may be instructive to set out an example of one embodiment. A prospective purchaser, or user, may be in the market for a used car. The user finds three cars that are of interest and fall within the desired price range. One vehicle is a black 2002 Jeep Grand Cherokee; a second is a burgundy 2003 Ford Explorer; and a third is a silver 2002 Jeep Grand Cherokee. Wishing to compare the three SUVs, the user may obtain the Vehicle Identification Number (VIN) for each vehicle and go to a website associated with a system according to the present disclosure. When the user enters each VIN, the number is transferred to an automated vehicle analysis system.

This system retrieves vehicle specifications as well as reported history items from, in one embodiment, third party providers of such information. As such, further details on the vehicle are identified. For example, the black Jeep, may have 40,231 miles on it, have been owned by two individuals, been registered in Chicago, may have been in one moderately classified accident, have received all regular maintenance, and been reported stolen once. The Explorer on the other hand may have 34,254 miles, been owned by one company for use as a rental car, been registered in Iowa, and been in three minor accidents. While this information in and of itself may be helpful, it is often hard to compare the two vehicles based on this information. For example, it may look better that the Explorer has fewer miles, but it may be hard to determine whether city or rural driving is more damaging. Similarly the effects of individual usage versus rental usage or the fact of having been reported as stolen versus having had three minor accidents can be difficult to compare.

As such, a system as disclosed herein uses information related to a large number of vehicles to create and apply multi-layer filters that automatically organize and manage incoming vehicle data to provide vehicle scores. This process helps determine which factors are more or less important in determining whether a vehicle will be on the road in, for example, five years. In an embodiment, a filter that extracts the data relevant to each of these factors generally comprises the first layer filter. This first layer can help reduce the processing resources required in further steps. For example, in an embodiment, information such as auction records and whether or not a vehicle has been rented commercially may be filtered out as irrelevant. It is understood, however, that the same data may or may not be used or filtered out in various embodiments.

In an embodiment, the factors may be translated into numerical values through a second filter layer. A third layer filter comprises a weight assigned to each factor based on the relative importance of each factor in the overall score. This third layer filter is applied to the data representative of each individual vehicle, and the weighted values are combined to generate the score. To further the example, the black Jeep may receive a score of 85, the Explorer a 77, and the silver Jeep an 80 (each with similar vehicle scoring between 84 and 78). The user, upon obtaining each of these values, then has a simple, standardized way of comparing each vehicle. The black Jeep has the best score of the three, and a user may decide to make that purchase, because it is most likely to last the greatest amount of time. Additionally, however, the user may use these scores to haggle prices with the dealers. For example, the silver and the black Jeeps seem relatively close in score, but the user may be able to negotiate a better price on the Silver Jeep based on its slightly lower score. In that case, it may be worth giving up a bit on the score to gain the better price.

Also, in one embodiment, the system may give scores or relative values of some or all of the various factors, so that the user can get a sense of which factors had the most or least effects on the overall score.

System

Turning to FIG. 1, in an embodiment, a system for generating vehicle scores includes a score generator 102 and any of a number of vehicle information databases or data sources. These databases may include Title and/or Registration Information database 104, Department of Motor Vehicle Records 106, Auction Records 108, and/or Accident Records 110. Vehicle information may also be obtained or derived from dealer records, state agency records, independent agency records, and the like. Vehicle information may be gathered from one or more of these databases or data sources into a primary vehicle database or stored in separate databases for use by the score generator 102 as needed. A system may also include a modeler 114 that helps determine the weighting of various factors to be used in a score. In an embodiment, the modeler 114 may include an actual or simulated neural network to help determine factor weightings. In an embodiment, modeler 114 may be a background process or module that may be run periodically regardless of specific score requests. Potential modeling processes are described in more detail below.

Figure 1B:
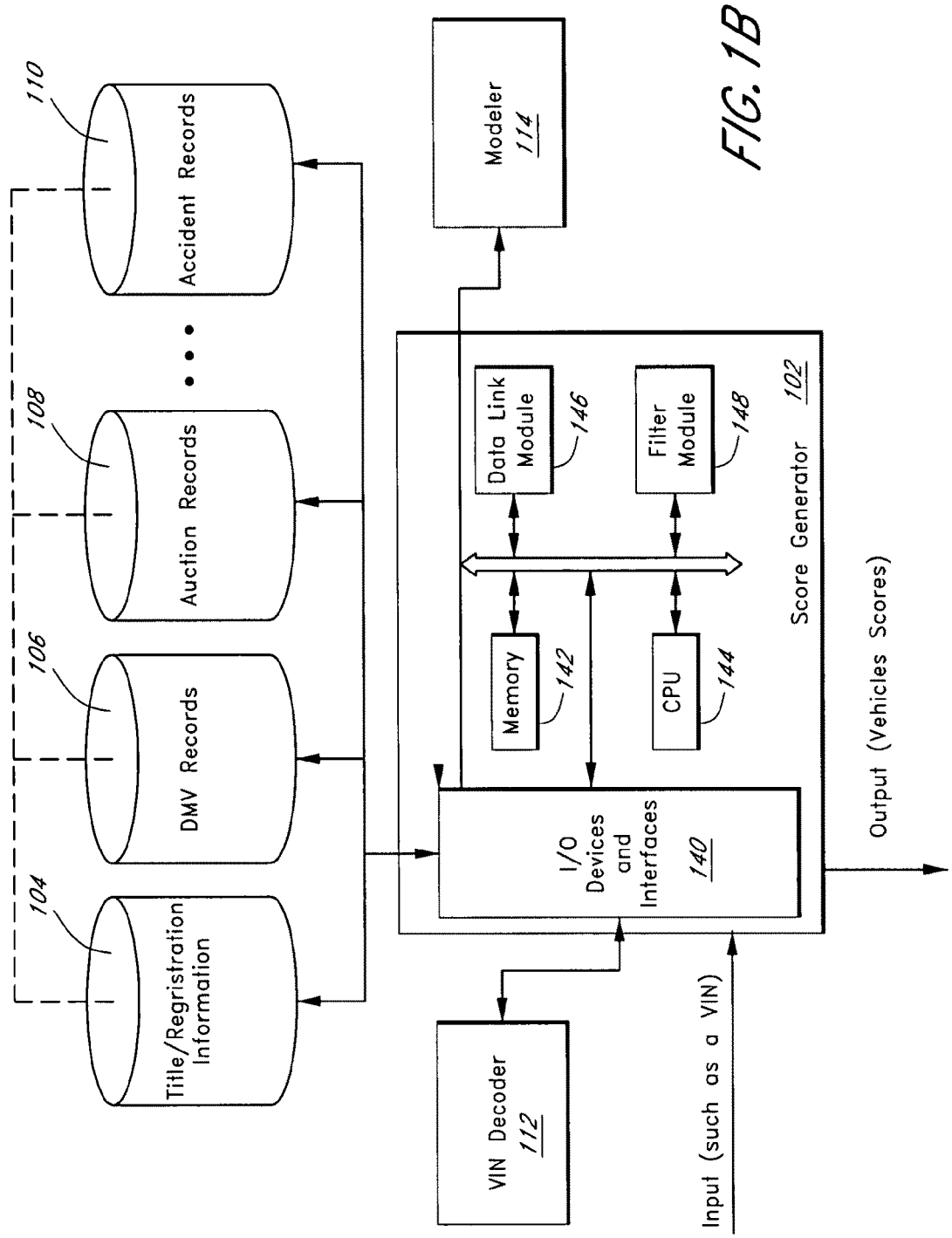
FIG. 1B illustrates a block diagram detailing an embodiment of a score generator in a system for generating a vehicle score.

A more detailed view of an embodiment of a score generator 102 in accordance with the teachings of this disclosure is pictured in FIG. 1B. Score generator 102 may preferably include one or more input/output (I/O) devices and interfaces 140 for communications with, for example, the databases 104, 106, 108, 110, a VIN decoder 112, and a modeler 114. Input from users and output from the score generator 102 may also be communicated through the I/O devices 140. Typically a score generator will also include one or more memory units 142 and one or more central processing units (CPUs) 144. A preferred embodiment of the score generator 102 will also include a data link module 146 and a filter module 148. The data link module 146 advantageously provides linking of associated data from the various databases 104, 106, 108, and 110. Through the data link module 146, the databases, which may store data in differing formats and/or according to different database keys, the score generator 102 may create a more complete picture of individual automobiles. In other embodiments, the data received from third parties is parsed by the data link module 146 and stored in a database in a linked format. Similarly, there may be a large number of databases storing both useful and extraneous information; in an embodiment, the filter module 148 may include a multi-layer filter or filter matrix. One or more layers can help reduce the amount of data being processed to that which is useful. The filter module 148 thus helps provide more efficient processing task for the CPU 144. The filter module 148 may additionally contain filter layers that translate and provide weighting to factors for scoring. In an embodiment, I/O devices 140, memory 142, CPU 144, the data link module 146, and the filter module 148 may be connected through a bus, network, or other connection. In an embodiment, the modeler 114 comprises a filter generator for filter module 148.

In an embodiment, an I/O device 140 of a score generator 102 accepts an input—such as a VIN—representing the vehicle to be scored. This information may be stored temporarily in memory 142 or used to retrieve vehicle attribute and history information from the various databases—or retrieve one file or complete database entry in the case of a combined primary vehicle database, or retrieve information from a combination of a combined primary vehicle database and one or more of the others. A VIN may also be passed to a VIN decoder 112 through an I/O device 140 to retrieve vehicle attribute information, such as make, model, year, country of manufacture, engine type, and the like. This is possible because VINs are unique identifiers with such information coded into them according to a standard that is agreed upon by car manufacturers.

In an embodiment, the score generator 102 may then select attributes that will be factors in the scoring. In an embodiment, the data link module 146 accepts records from the various databases 104, 106, 108, 110 and/or outside sources and links together records that correspond to the input VIN. Some records may not have an associated VIN, in which case the data link module 146 can utilize some other common element or set of elements to link the records. For example, many records that do not include a VIN include a license plate number which can be used in conjunction with a record, such as a DMV report to link the VIN. As license plates may be transferred among cars, the dates of the disparate records may help dissociate ambiguities. The filter module 148, in an embodiment, can filter the incoming records from the databases to limit extraneous data that is linked by the data link module 146. In an alternative embodiment, the data link module 146 may link all incoming data associated with a VIN, and then pass the linked information to the filter module 148 to filter out extraneous data. Additional filter layers for filter module 148 may convert the target vehicle's attributes into numerical values for those factors. This conversion for each factor value may be based in whole or in part on a comparison with an average factor value for the vehicles in the comparison pool (such as all vehicles, a specific vehicle class, or a specific make/model/year). Yet another filter layer may then multiply each of these factor values by a weight for the given factor; the results are summed to create a representative score. The weighting filter layer gives each factored attribute a larger or smaller impact on the final score based on factors that are more or less important. A representative example will be discussed below to help give a more concrete representation of these concepts.

Once a vehicle score is determined it may be output to the requesting user via a display screen, a printer, output audibly, and the like. In an embodiment, the score generator 102 may be connected to or part of a web server that accepts queries from users via the internet, such as by a web browser. For example, a user may utilize an internet browser to access a website, such as Autocheck.com (http://www.autocheck.com) or other website currently operated by the assignee of the present disclosure. The user may enter the VIN number of a 2002 Audi A4 that he or she is considering purchasing; this VIN number is relayed to the score generator 102. In other embodiments, the use may enter a VIN on a third party website, which will be passed to the score generator 102. Score generator 102 retrieves information about that car. In doing so, it may independently verify the make, model, and year of the car. It may also retrieve the number of registered owners based on DMV or other records; the number and severity of accidents reported based on police reports, insurance company claims, or some other source; the locations registered; and the like. These factors may be selected and given individual values. For example, if no accidents were reported, the car may receive a ten (10), a car with one minor accident a seven (7), a car that was in several major accidents a two (2), etc. Each of the factors is then weighted. For example, the accident value may be relatively important and be weighted at six-tenths (0.6), while the location used may be less important and receive only a weighting of two-tenths (0.2). All of these resulting values may then be added to receive a final score, such as that the car ranks a 7.8 against all cars. A different pass through the score generator 102, may show that the car only ranks a 4.6 against all other 2002 Audi A4s, however. In an embodiment, this may indicate that the specific car is well more likely than the average car to still be on the road in five years, but that it is somewhat less likely than the average 2002 A4 to be on the road in five years (assuming an average value of five (5) for each).

In an embodiment, the score generator 102 may output the final score (or scores) to the user as a portion of a web page operated by the operator of the present system. In other embodiments, the final score or scores may be sent to a third party web server for display on a web page of a third party.

System Information

The various features and functions described in this document may be embodies in software modules executed by one or more general purpose computing devices or components, such as the CPU 144. The modules may be stored in any type of computer readable storage medium or device.

Suitable hardware for a vehicle scoring system includes a conventional general purpose single-chip or multi-chip microprocessor such as a Pentium® processor, a Pentium® II processor, a Pentium® Pro processor, an xx86 processor, an 8051 processor, a MIPS® processor, a Power PC® processor, or an ALPHA® processor. In addition, the microprocessor may be any conventional special purpose microprocessor such as a digital signal processor. Furthermore, the score generator 102 may be used in connection with various operating systems such as: Microsoft® Windows® 3.x, Microsoft® Windows 95, Microsoft® Windows 98, Microsoft® Windows NT, Microsoft® Windows XP, Microsoft® Windows CE, Palm Pilot OS, OS/2, Apple® MacOS®, Apple® OS X®, Disk Operating System (DOS), UNIX, Linux®, VxWorks, or IBM® OS/2®, Sun OS, Solaris OS, IRIX OS operating systems, and so forth. In an embodiment, an I/O device and interface 140 may be a network device and a network interface module to facilitate communication between it and user access points. The VIN decoder 112, databases 104, 106, 108, 110, and/or the modeler 114 may be implemented on the same or disparate hardware as the score generator 102. For example, in an embodiment, one or more of the modeler, 114, databases 104, 106, 108, 110, and/or VIN decoder 112 are part of the score generator 102.

User Access

As stated, user access may be through a web-enabled user access point such as the user's personal computer or other device capable of connecting to the Internet. Such a device will likely have a browser module that may be implemented as a module that uses text, graphics, audio, video, and other media to present data and to allow interaction with data via the communications network. The browser module may be implemented as a combination of an all points addressable display such as a cathode-ray tube (CRT), a liquid crystal display (LCD), a plasma display, or other types and/or combinations of displays. In addition, the browser module may be implemented to communicate with input devices and may also include software with the appropriate interfaces which allow a user to access data through the use of stylized screen elements such as, for example, menus, windows, dialog boxes, toolbars, and controls (for example, radio buttons, check boxes, sliding scales, and so forth). Furthermore, the browser module may communicate with a set of input and output devices to receive signals from the user. The input device(s) may include a keyboard, roller ball, pen and stylus, mouse, trackball, voice recognition system, or pre-designated switches or buttons. The output device(s) may include a speaker, a display screen, a printer, or a voice synthesizer. In addition a touch screen may act as a hybrid input/output device. In another embodiment, a user may interact with the system more directly such as through a system terminal connected to the score generator without communications over the Internet, a WAN, or LAN, or similar network.

In one embodiment, a user access point comprises a personal computer, a laptop computer, a Blackberry® device, a portable computing device, a server, a computer workstation, a local area network of individual computers, an interactive kiosk, a personal digital assistant, an interactive wireless communications device, a handheld computer, an embedded computing device, or the like.

Sample Scoring Process

Figure 2:
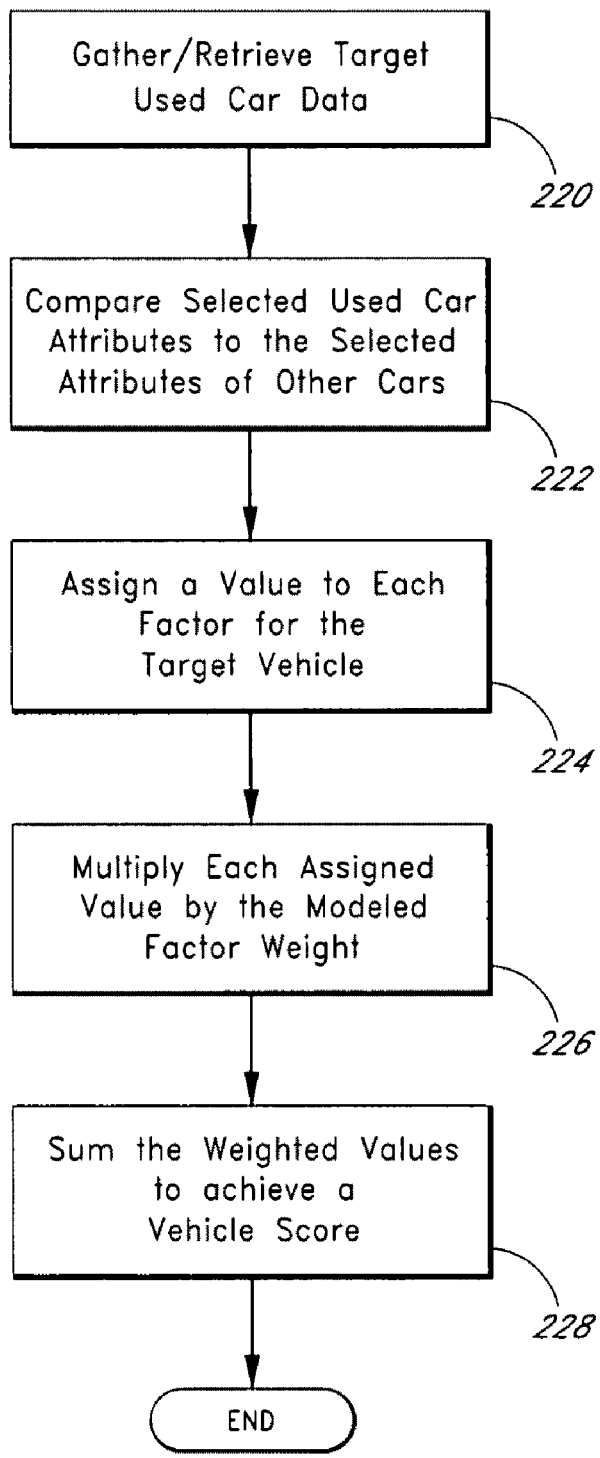
FIG. 2 illustrates a flow diagram of a vehicle scoring method in accordance with an embodiment of the present disclosure.

Although a process that score generator 102 may go through in an embodiment of the present disclosure was discussed briefly above, another process embodiment and some alternatives will be discussed with reference to FIG. 2. Beginning with a vehicle identifier, such as a VIN, or a set of identifiers, data on the target vehicle is gathered or retrieved in block 220; the data link module 146 may help link the disparate records that are gathered. This may be from a precompiled database or one or more of the sources discussed above. This information preferably at least includes information relating to each factor going into the scoring. If there is missing or unreported information, a negative factor value may be presumed or the factor may be disregarded. Alternatively, an average value may be presumed. If any factors do not necessarily reflect complete data, this can be reported to the user in order to provide the user a gauge of the score's potential error.

In block 222, data gathered on the target vehicle is compared to the other vehicles in the database. Target attributes may be compared to actual vehicle data or a precompiled amalgamation of the vehicles of a given class. For example, the average number of owners, the average mileage, and other average values may be predetermined and stored for easy comparison. This precompilation of data may be preferable to reduce processing resources required for each score request. Preferably, in an embodiment, these hypothetical average cars are created for each class for which scoring is available. For example, in an embodiment, the system may store the attributes of a hypothetical average overall car, as well as hypothetical average make/model combinations.

Figure 3:
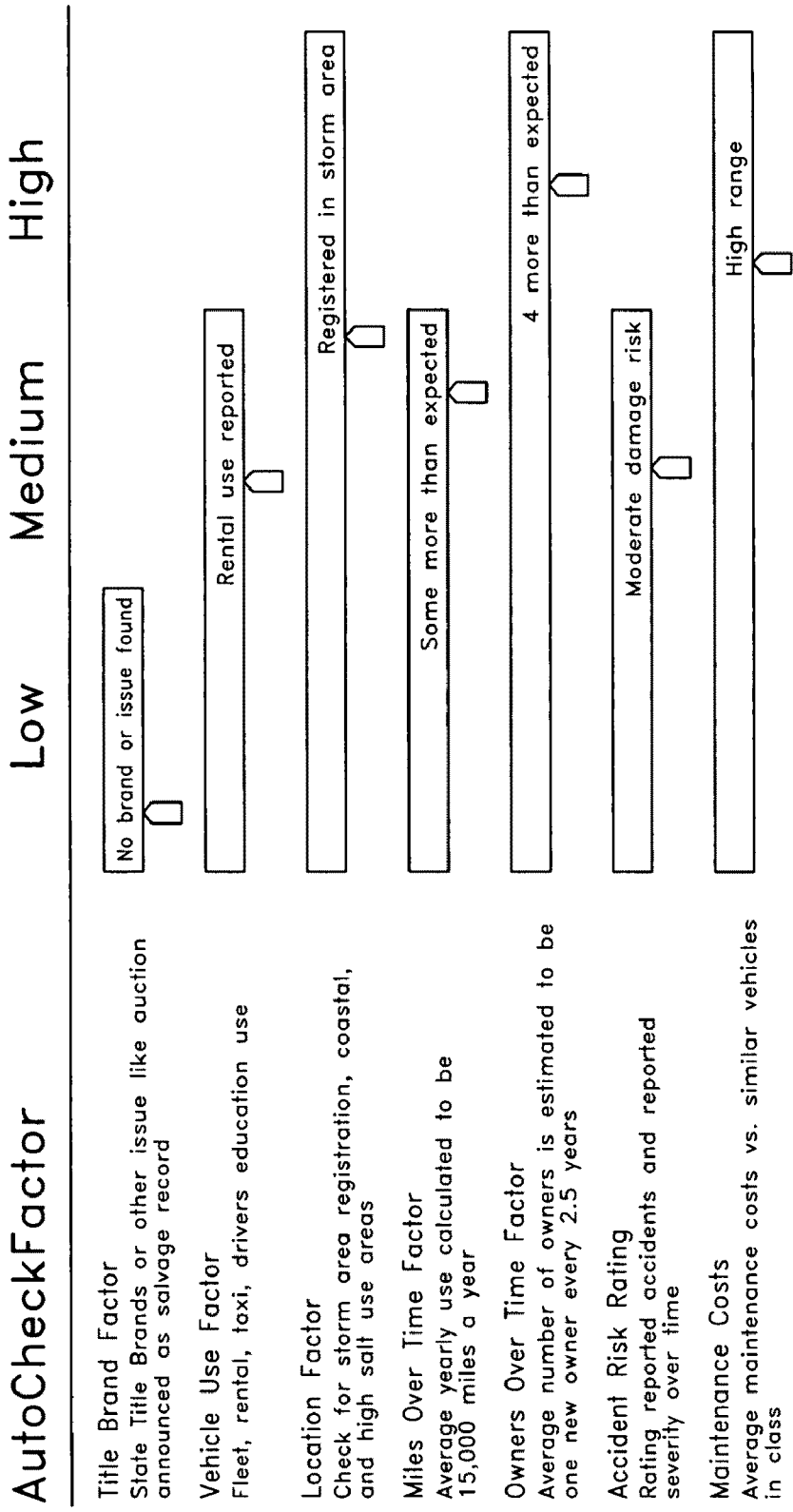
FIG. 3 illustrates a sample output box displaying the relative risk ratings of factors that may go into a score in accordance with an embodiment of the present disclosure.

Based in part on these comparisons, various factors going into the vehicle score are translated into numerical values for the target car in block 224; this may be accomplished through one or more layers of a filter module 148. In some embodiments, these individual factor values may be reported to the user, in numerical or graphical form. A sample output of such data is shown in FIG. 3. Each of the factors listed therein are possible factors in one or more embodiments, and more will be discussed below. In FIG. 3, the individual factors are represented as the relative risk to a potential purchaser of problems with the vehicle. Each factor could also be individually reported as a percentage representation of the vehicle's likelihood of being on the road in five (5) years based on that factor, or otherwise in line with the overall scores.

Figure 6:
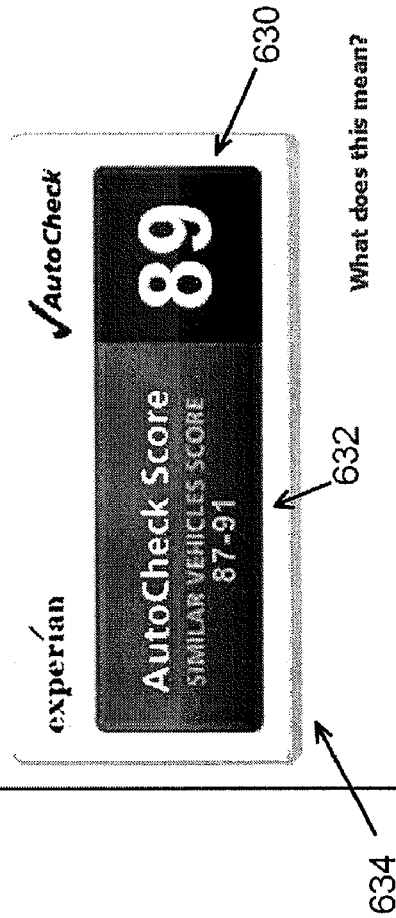
FIG. 6 illustrates a sample output box for display of a score to a user in accordance with an embodiment of the present disclosure.

Returning to FIG. 2, each of the assigned values for the given factors are multiplied by a factor weight through, in an embodiment, a filter layer of module 148 (block 226). This gives the more important factors, as determined by prior modeling, a greater impact on the overall score than less important factors. For example, in an embodiment, if car color is a factor but is determined to have no effect on the likelihood of a vehicle being on the road in five years, the color factor weight would be zero (0) so that it does not impact the results. In an embodiment, mileage may have significant effect on the overall score and thus get a relatively high value, such as eight-tenths (0.8). Block 228 sums the resulting weighted factor values to achieve a final vehicle score. Again, a filter layer may be employed to sum or otherwise combine the various factors. Sample resulting scores for an overall vehicle score and a make/model vehicle score are shown in FIGS. 4 and 6. In FIG. 4, the numerical scores are given as well as a relative risk bar graph. The graphic view may be preferred for quick review, particularly of a single car, and seeing whether or not it is at risk of lasting less than a given number of years and so on. The numerical score, on the other hand, may provide a more accurate way to compare multiple cars that a purchaser is considering.

It is, of course, understood that this is just one method of arriving at a score. The final weighted factor values may be averaged or otherwise combined in other embodiments. In some embodiments, the final weighted factor values may also be used in some of the created filters and not in others. The scale for the score will be well known to be variable by those of skill in the art. One embodiment may produce scores between 0 and 100, another 0 to 10, yet another between 0% and 100%, and so on. Conveying the range of the scale to a user should provide sufficient context for a user to interpret the vehicle scores that are reported. For example, range information may include absolute highest and lowest actual and/or theoretical scores for all vehicles for which an embodiment of the disclosure has information. In an embodiment, a user may be presented a range of some or a majority of the scores of any automobile in the database. One range may include the median 50% of car scores, for example.

Looking to FIG. 6, there is a sample "Summary" output box, such as may be included in a website output to a user. As shown, the "Summary" box may include general information on the specific vehicle, such as its VIN, make, model, class, age, and the like. FIG. 6 also shows an inset box with a vehicle score 630 of "89." A score range 632 for similar vehicles is also shown as "87-91." As stated, this range may indicate that the median 50% of similar vehicles will fall within this score range 632. As such, 25% of vehicles would score below and 25% would score above this range 632. In the example shown, the Nissan 350Z whose VIN was input scores right at the median. It is understood that the range may differ among embodiments. For example, different median percentages, standard deviation calculations, and/or the like may determine the range. The sample shown in FIG. 6 also indicates that "similar vehicles" are generally within a specific range. The definition of similar vehicles may change among various embodiments. For example, age ranges and/or class designations may define the population of "similar vehicles." In another embodiment, for example, similar vehicles may be limited to the same or a set of makes, models, model years, "style/body" designations, and/or the like.

Score Reporting Options

As alluded to above, there are a number of options for presenting a vehicle score to a user, as well as the information, if any, which provides additional context to the score. An embodiment of the disclosed system may comprise or be in communication with a web server. In such an embodiment, a user may access scores by entering a VIN on a website and receiving output such as shown in one or both of FIGS. 4 and 6. A used car listing on the web, such as one provided by a dealer, a classifieds site, or the like, may also provide a link to access a vehicle score of a stored VIN, in addition to or instead of requiring user entry of a VIN.

In various embodiments, the vehicle score may be provided directly to a user through the system or to a user through a third party web site. In an embodiment including a third party web site, there are various options for reporting the score. In one embodiment, the system may output the score in any of a number of formats, such as xml format, for interpretation and inclusion in a web page controlled by the third party. For example, looking to FIG. 6, the third party may control the layout and information included by retrieving the vehicle score 630 from the score generator 102 (FIG. 1) and including it in its own web page layout. In another embodiment, a third party may cede control of a portion of the web page, such as the inset score box or tile 634, to an embodiment of the disclosed system. In such a case, for example, the third party web page may include code, such as an applet, that directs the requesting user system to a web server associated with the disclosed system or the score generator 102 itself to complete the score tile 634. The latter embodiment may be preferable as it can provide additional security and reliability to the score, because it may be more difficult for the third party web site to tamper with the score.

In either case, it is preferred that the look-up and scoring be dynamic, meaning that each time the vehicle score tile 634 is loaded, the scoring of the vehicle is redone by the score generator 102. This helps to ensure that a user is viewing the most accurate score available, based on the most recent data updates regarding the vehicle history of the car for which he or she is seeking a score. Dynamic scoring can also allow increased design flexibility. For example, in an embodiment, users may be able to customize scores based on one or more factors that they consider most important. For example, a user may wish to skew higher scoring toward vehicles driven mostly in rural locations as opposed to urban environments, considering that more important. Additionally, in an embodiment, dynamic scoring allows scoring models to be updated without requiring huge amounts of processing time to rescore all vehicles. Although less preferred, scores may also be retrieved from databases that store the scores calculated on some periodic or random basis, such as daily, weekly, or the like.

Factors

The factors generally will relate to the physical characteristics of the vehicle and/or the history of the vehicle. Any of a number of such attributes may be used in certain embodiments, but factors are likely to be one or more of the following: make, model, year, engine type, equipped options, number of owners, mileage, number of accidents, severity of accidents, length of time retained by each owner, location(s) of primary usage, length of any remaining warranties, maintenance history, type of use (e.g. fleet vehicle, government, rental vehicle, taxi, privately owned, etc.), number of times at auction, emissions test records, major branding events (such as a lemon notification, manufacture buyback, total loss/salvage event, water/flood damage, or negative announcement at auction), odometer branding, odometer rollback modeling, stolen vehicle records, repossession records, and the like. Other factors may include driver education data, whether or not a vehicle was used as crash test vehicles, vehicle safety information, crash test ratings, recall information, and the like. Other embodiments may have additional factors not mentioned here, and factors listed here may not be included in all embodiments.

In an embodiment, some of the factors may be numerical values used in raw form, such as the actual number of owners of a car or the absolute number of accidents in which a car was involved. In an embodiment, some of the factors may be relative numbers, such as a value between one (1) and ten (10), with, for example, ten (10) representing far less mileage than the average vehicle of a given age and one (1) representing far more mileage than an average vehicle of the given age. It should be recognized that some factors may be either actual or relational in various embodiments, such as mileage or the length of time specific owners held the car.

Additionally, some factors may be derived values that are based on non-numeric attributes, amalgamations of various individual attributes, related to different numerical attributes, and the like. For example, a value may be derived based on the relative longevity or brand desire of specific makes (a BMW may get a higher value than a Kia, for example). In an embodiment, individual attributes may be analyzed together to create a single factor value such as for maintenance, which may include both the costs and number of maintenance events. A car's location, based on zip code or other identifier, may be ranked with a high, medium, or low risk value such as for flood prone areas versus high salt areas versus temperate areas, or rural versus urban areas, and the like.

While a number of the possible factors have been enumerated herein, it is understood that not all such factors may be utilized in any given embodiment. It would also be known to one of skill in the art that others not mentioned may be utilized in a similar manner or to approximate some of those factors mentioned herein. The present disclosure is not limited by the specific factors but is defined by the limitations of the claims.

Additionally, one or a subset of factors may be determined to have a more significant effect on a resulting score or affect which other factors should be included for more accurate scoring. In such a case, multiple models may be used for different subsets of the overall vehicle market. For example, it may be determined that the age of the vehicle is a very significant factor in determining its score. Once age is broken out, the number of accidents may be the most significant factor in determining a score of a relatively new car, whereas a much older car may be affected mainly by the brand or quality of production of the older car or the number of owners it has had. It is understood from the disclosure herein then that a score generator 102, in an embodiment, may utilize different "sub-models" to generate scores for different segments of the market or to contribute to the overall model. Such an embodiment, where vehicles in different age categories have different factors and weightings that contribute to each score, is described in more detail below.

Modeling

In order to be able to determine which factors to include and/or which included factors should be weighted most heavily in determining the vehicle scores (such as to create various filter layers for the filter module 146), it may be useful to model the weights of one or more sets of factors to determine the relative correlations of each factor to the ultimate outcome. There are a number of modeling techniques that may be used to determine these weights.

Figure 5:
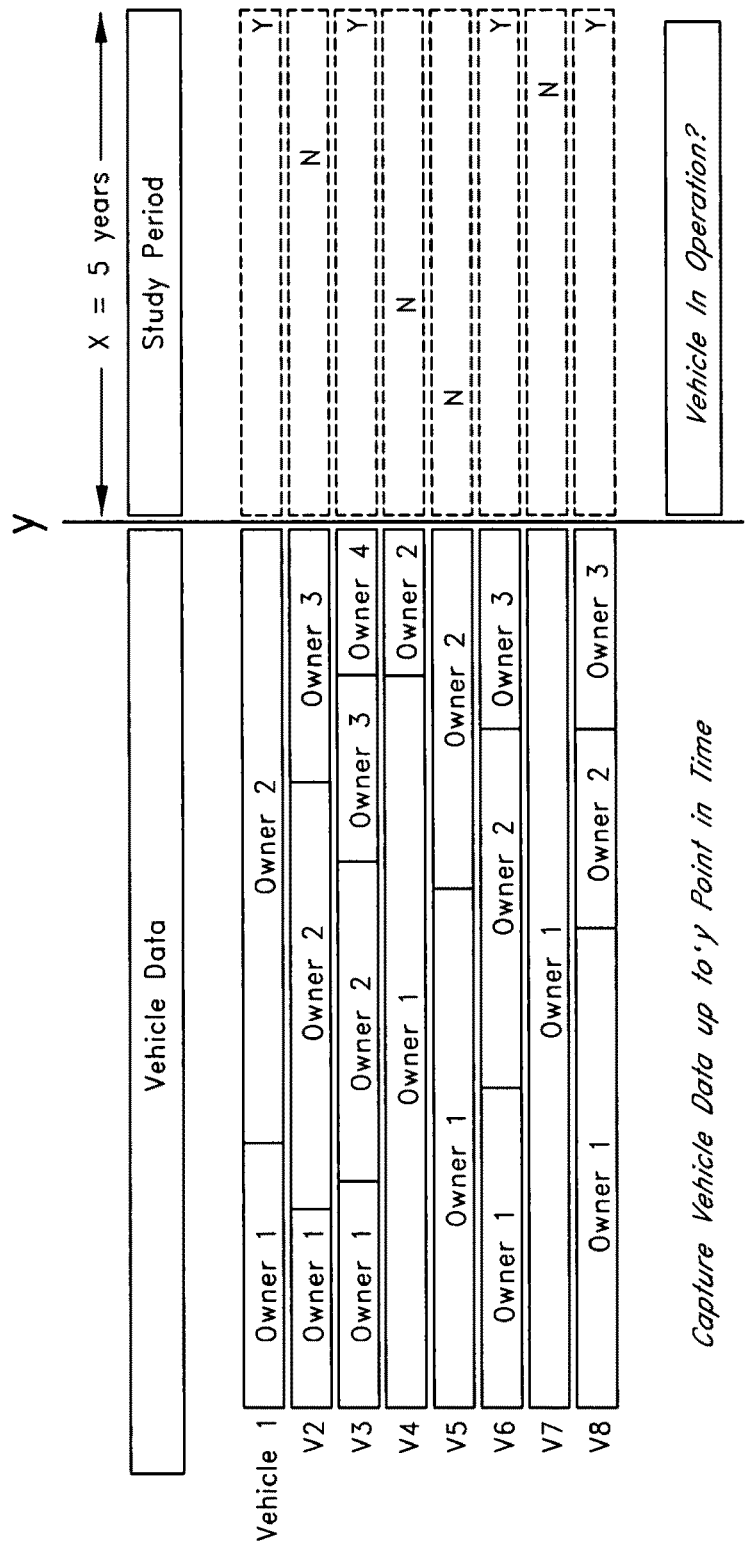
FIG. 5 illustrates a sample of modeling data that may be used in an embodiment of the systems and methods of the present disclosure.

It is generally helpful to gather a study file, in this case a large number of vehicle records, including information on all of the potential factors that are believed might be useful in predicting the scores. To continue the example of a score representing the likelihood of a vehicle still being on the road in five years, it is necessary to include data from both vehicles that remained on the road during a given time period and vehicles that did not. FIG. 5 gives a diagrammatic representation of this. In order to model the likelihood of cars being on the road after five years, a time cutoff Y must be chosen that is at least five years prior to the last data available. The only information relevant after this time period then, in this example, is a binary value of whether or not the vehicle is still on the road. In FIG. 5, Vehicles 1, 3, 6, and 8 were still on the road, and the others had been salvaged, junked, or otherwise reported to be off the road (this may also come from an assumption, such as that the car's registration had lapsed for a certain period of time, such as more than 18 months, based on state registration rules). All the data on the vehicles, prior to the time Y is then potential factor data. Data that may be gathered for this study file includes: the Vehicle In or out of Operation designation; number of owners; odometer reading prior to Y; mileage by owner(s); VIN Detail—make, model, year, engine size, country of manufacture, performance options, number off the line, etc.; brands prior to Y, meaning adverse events registered by a state (such as lemon designations, manufacturer buybacks, salvage yard notices, negative announcements at auction); Geography—MSA (metropolitan statistics area)/state/zip/latitude/longitude/etc. by owner; number of months retained by owner(s); number of accidents reported before Y; number of times at auctions prior to Y; any indication of odometer rollback (this may be a calculated value); MSRP Value at Y, at time of retail, and/or at other specific other times; number of times failed emissions; purchase type by owner (such as whether use would be for fleet/government/lease/individual ownership/etc.).

Initial weights for each factor may be assigned at random or may represent estimations. Changing the weight of the various factors may then result in better or worse models. Such modeling may be done by a number of well-known methods such as through the use of neural networks, logistic regression and the like. The approach may also be hands-on with statisticians or others aiding the modeling process or automated, such as with back propagation in a neural network to improve modeling.

Details of an Embodiment

The following is a description of an embodiment of a vehicle scoring model, according to the present disclosure, including coding specifications. As can be seen, this embodiment utilizes multiple models for different vehicle age categories. In this embodiment, the models were built to estimate the likelihood that a vehicle will be on the road in 5 years. The probability created by these models is the score for this embodiment.

The following outlines a detailed procedure for implementing one embodiment of the present disclosure, titled AutoCheck Vehicle score. This model should be applied to each vehicle based upon the age of the vehicle and only those vehicles with event history information. Separate models were developed for six mutually exclusive age groups, namely 0-3 years; 4-5 years; 6-8 years; 9-10 years; 11-12 years; and 13+ years. The following disclosure includes details of an example process for obtaining a score, based on the testing of a large sample set of data by Experian, the assignees of the present disclosure. It is important to recognize that this section is describing one embodiment only, and it will be easily understood from the teachings herein how other factors, weighting, combinations thereof, and the like can be used in a myriad of ways to create other embodiments in keeping with these teachings.

Utilizing standard modeling techniques as discussed above, it was determined that a number of input variables were of value. Variables taken from the database(s) records may be identified as "primary factors." In this embodiment, they include the make and model year of the vehicle. The manufacturers suggested retail price ("MSRP") of the vehicle and the value of loan are also utilized; this information may be obtained from publicly available sources such as Black Book, available from National Auto Research. In this embodiment, a vehicle class as designated by Automotive News, a well-known automotive industry publication, is a factor. Whether or not a vehicle is AutoCheck® Assured® is another factor. AutoCheck® Assurance is a service publicly available from Experian, the assignees of the present disclosure, at http://www.autocheck.com. It takes into account factors such as title branding, theft, water damage, auction branding, and the like. The total number of owners is another factor, and for each owner, state and zip location factors are utilized. Additionally, odometer readings throughout the life of the vehicle and various events in the history of a car, as well as the timing of each event, are recorded as factors. It is to be understood that any number of events may be recorded and utilized, and preferably all recorded events in a vehicle's history are factored into the score. Events in this example include emissions checks, use of the vehicle by the government, specific use by police, accident, theft, and repossession occurrences, and whether the vehicle was used as a taxi or limousine. Similarly data on each of multiple owners may be used. The input variables are listed in Table 1 and specific event variable codes are listed in Table 2.

TABLE 1

INPUT VARIABLES

| Variable | Description |
|---|---|
| VEHICLE DATA | |
| MODELYR | Model Year of Vehicle |
| VALMSRP | Value of MSRP |
| VALLOAN | Value of Loan |
| MAKETXT | Make Text of Vehicle |
| VEHCLASS | Vehicle Class |
| HASSURED | AutoCheck Assured |
| TOTOWN1 | Total Number of Owners |
| | OWNER #1 |
| STATE1 | State of Current Owner |
| ZIPLOC1 | Zip Locality of Current Owner |
| | OWNER FILE |
| LEASE01 | Lease Flag—Owner #1 |
| LEASE02 | Lease Flag—Owner #2 |
| LEASE03 | Lease Flag—Owner #3 |
| LEASE04 | Lease Flag—Owner #4 |
| LEASE05 | Lease Flag—Owner #5 |
| LEASE06 | Lease Flag—Owner #6 |
| LEASE07 | Lease Flag—Owner #7 |

TABLE 1-continued

INPUT VARIABLES

| Variable | Description |
|---|---|
| LEASE08 | Lease Flag—Owner #8 |
| LEASE09 | Lease Flag—Owner #9 |
| LEASE10 | Lease Flag—Owner #10 |
| EVENT HISTORY DATA | |
| EODO1 | Odometer Reading—Event #1 |
| EODO2 | Odometer Reading—Event #2 |
| EODO3 | Odometer Reading—Event #3 |
| EODO4 | Odometer Reading—Event #4 |
| EODO5 | Odometer Reading—Event #5 |
| EODO6 | Odometer Reading—Event #6 |
| EODO7 | Odometer Reading—Event #7 |
| EODO8 | Odometer Reading—Event #8 |
| EODO9 | Odometer Reading—Event #9 |
| EODO10 | Odometer Reading—Event #10 |
| EDATYR1 | Event Year—Event #1 |
| EDATYR2 | Event Year—Event #2 |
| EDATYR3 | Event Year—Event #3 |
| EDATYR4 | Event Year—Event #4 |
| EDATYR5 | Event Year—Event #5 |
| EDATYR6 | Event Year—Event #6 |
| EDATYR7 | Event Year—Event #7 |
| EDATYR8 | Event Year—Event #8 |
| EDATYR9 | Event Year—Event #9 |
| EDATYR10 | Event Year—Event #10 |
| EDATMT1 | Event Month—Event #1 |
| EDATMT2 | Event Month—Event #2 |
| EDATMT3 | Event Month—Event #3 |
| EDATMT4 | Event Month—Event #4 |
| EDATMT5 | Event Month—Event #5 |
| EDATMT6 | Event Month—Event #6 |
| EDATMT7 | Event Month—Event #7 |
| EDATMT8 | Event Month—Event #8 |
| EDATMT9 | Event Month—Event #9 |
| EDATMT10 | Event Month—Event #10 |
| ECHEK01 | Event Checklist—Event #1 (leased, repossessed, etc.) |
| ECHEK02 | Event Checklist—Event #2 |
| ECHEK03 | Event Checklist—Event #3 |
| ECHEK04 | Event Checklist—Event #4 |
| ECHEK05 | Event Checklist—Event #5 |
| ECHEK06 | Event Checklist—Event #6 |
| ECHEK07 | Event Checklist—Event #7 |
| ECHEK08 | Event Checklist—Event #8 |
| ECHEK09 | Event Checklist—Event #9 |
| ECHEK10 | Event Checklist—Event #10 |

TABLE 2

EVENT VARIABLES

| | |
|---|---|
| EMISSION | Vehicle has gone through an emission inspection, defined by ECHEK01 through ECHEK30 = '3030' |
| GOVUSE | Vehicle was used by a government agency defined by ECHEK01 through ECHEK30 = '5030' |
| POLICE | Vehicle was used by a police agency defined by ECHEK01 through ECHEK30 = '5040' |
| ACCIDENT | Accident records were found for the Vehicle, defined by ECHEK01 through ECHEK30 = '3000' |
| THEFT | Vehicle was stolen, Insurance claim filed, Auction announced as stolen, etc. defined by ECHEK01 through ECHEK30 = '3090' |
| REPOSS | Repossessed Vehicle defined by ECHEK01 through ECHEK30 = '5080' |
| TAXI | Vehicle is or was used as a taxi, defined by ECHEK01 through ECHEK30 = '5050' |
| LIVERY | Vehicle is "for hire" to transport people, defined by ECHEK01 through ECHEK30 = '5020' |

Additional factors may be derived through the use of these primary factors. The derived factors, as in this example embodiment, can include the age of the vehicle, maximum mileage, date of last mileage reading, time since that mileage reading, estimated mileage since last reading, estimated total mileage, the MSRP ratio, and whether or not a vehicle has been leased, and are described in Table 3.

TABLE 3

VARIABLES TO CREATE FOR MODELS

| | |
|---|---|
| CURRYR | Current Year |
| CURRMTH | Current Month |
| AGE | Age of Vehicle |
| MAXEMILE | Maximum Mileage based upon Odometer reading |
| MAXEYR | Event Year associated with Maximum Odometer reading |
| MAXEMTH | Event Month associate with Maximum Odometer reading |
| NOM | Number of Months for Mileage Update |
| UPMILES | Monthly miles to update |
| FINMILE | Sum of Maximum Odometer reading and Updated miles (UPMILES * NOM) |
| MSRP RATIO | Value of Loan/Value of MSRP |
| LEASE | Defined by LEASE01 through LEASE10 = 'Y' |

As can be seen from Table 3, an algorithm may be used to estimate the number of miles since the last reported mileage event. The following algorithm details a process for estimating mileage in cases where time has elapsed between the last recorded odometer reading and the present (or the time for which a score is desired). In this embodiment, the estimation is based on the state and zip codes where the car is registered, and, presumptively, most used. It has been determined that the location of use may provide a relatively good approximation of the mileage driven over certain periods of time.

Below are descriptions and coding specifications for creating the table to update AutoCheck mileage based upon the Event History data. The mileage is updated based on each event reported that has a corresponding odometer/mileage reading. The state and ZIP Code where the event occurred, as well as ZIPLOC, a Zip locality variable, are used in the update process.

First, a sample set of VINs is used and event information is gathered for each VIN. Each event with an odometer reading greater than zero is sorted by date. Each VIN then gets a counter variable for the number of qualifying odometer events.

A number of variables are then created, including CURRYR, the current year, and CURRMTH, the current month. Each event then gets a count of the number of months from the event to the current month (NOM1=(CURRYR−EVENT DATE YEAR−1)*12+(CURRMTH+12−EVENT DATE MONTH). Additionally, the number of miles for each event is then calculated (EVENT_MILES is the Odometer reading for the next future listed event minus the Odometer reading for the current event). The number of months (NOM) between events is also then similarly calculated. This data is used to create an average number of miles per month for each event (If NOM greater than 0, MILEMTH=ROUND(EVENT_MILE/NOM)).

If information on the State for the event is unavailable, STATE="00." The ZIPLOC variable is also recoded as follows:

If ZIPLOC equals 'B2' then ZIPLOC=1 [business]
If ZIPLOC equals 'C1', 'C2', 'C3', 'C4' then set ZIPLOC=2 [city]
If ZIPLOC equals 'R0', 'R1', 'R2', 'R3', 'R4' then set ZIPLOC=3 [rural]
If ZIPLOC equals 'R5', 'R6', 'R7', 'R8', 'R9' then set ZIPLOC=4
If ZIPLOC equals 'S0', 'S1', 'S2', 'S3', 'S4' then set ZIPLOC=5 [suburban]
If ZIPLOC equals 'S5', 'S6', 'S7', 'S8', 'S9' then set ZIPLOC=6
Else set ZIPLOC=7

Finally a lookup table is created. In an embodiment, this is based on a set number of general rules. The updated mileage table should be based upon the last six years. Older events should be factored out. Calculate the average miles per month for each STATE and ZIP LOCALITY combined as well as each State. Evaluate the sample size for each STATE and ZIP LOCALITY. If the sample size is less than 100, then replace average using a similar state. For example, cars in North Dakota in Business (B2) Zip Codes might be replaced with the average monthly miles for vehicles in South Dakota with Business Zip Codes. Replace all missing Zip Localities (those coded to the value '7') with the average monthly miles for the state.

Based upon the most recent owner's State and Zip Locality, the update mileage variable (FINMILES) can then be determined from the table (FINMILES=NOM*UPMILES+MAXEMILES). Table 4 is an example of the table used.

TABLE 4

UPDATE MILEAGE LOOK-UP TABLE

| State | Zip Locality | Final Miles |
|---|---|---|
| Missing | 1 | 1483.12 |
| Missing | 2 | 5020.58 |
| Missing | 3 | 4275.67 |
| Missing | 4 | 1483.12 |
| Missing | 5 | 3604.38 |
| Missing | 6 | 1483.12 |
| Missing | 7 | 1377.39 |
| AA | 2 | 1483.12 |
| AA | 7 | 1483.12 |
| AB | 7 | 1483.12 |
| AE | 7 | 1483.12 |
| AK | 1 | 1311.42 |
| AK | 2 | 1232.92 |
| AK | 3 | 1092.14 |
| AK | 4 | 1225.94 |
| AK | 5 | 1086.66 |
| AK | 6 | 1573.99 |
| AK | 7 | 1048.88 |
| AL | 1 | 1582.03 |
| AL | 2 | 1796.36 |
| AL | 3 | 1845.35 |
| AL | 4 | 1920.83 |
| AL | 5 | 1848.28 |
| AL | 6 | 1907.61 |
| AL | 7 | 1768.34 |
| AP | 7 | 1483.12 |
| AR | 1 | 2169.12 |
| AR | 2 | 2106.40 |
| AR | 3 | 2024.48 |
| AR | 4 | 2272.49 |
| AR | 5 | 2518.71 |
| AR | 6 | 2198.32 |
| AR | 7 | 2094.09 |
| AZ | 1 | 2082.01 |
| AZ | 2 | 1579.05 |
| AZ | 3 | 1360.49 |
| AZ | 4 | 1776.14 |
| AZ | 5 | 1504.59 |
| AZ | 6 | 1804.62 |
| AZ | 7 | 1771.60 |
| CA | 1 | 1554.46 |
| CA | 2 | 1748.52 |
| CA | 3 | 1411.67 |
| CA | 4 | 2077.00 |
| CA | 5 | 1546.35 |

TABLE 4-continued

UPDATE MILEAGE LOOK-UP TABLE

| State | Zip Locality | Final Miles |
|---|---|---|
| CA | 6 | 1587.49 |
| CA | 7 | 1226.67 |
| CO | 1 | 1541.59 |
| CO | 2 | 1880.47 |
| CO | 3 | 2025.40 |
| CO | 4 | 2160.06 |
| CO | 5 | 1648.34 |
| CO | 6 | 2322.54 |
| CO | 7 | 1728.68 |
| CT | 1 | 1246.95 |
| CT | 2 | 1312.29 |
| CT | 3 | 1456.99 |
| CT | 4 | 1422.18 |
| CT | 5 | 1343.64 |
| CT | 6 | 1379.56 |
| CT | 7 | 1460.49 |
| DC | 1 | 1475.79 |
| DC | 2 | 3513.60 |
| DC | 4 | 2192.27 |
| DC | 5 | 1689.88 |
| DC | 6 | 1956.93 |
| DC | 7 | 1678.53 |
| DE | 1 | 1963.05 |
| DE | 2 | 1756.44 |
| DE | 3 | 1776.50 |
| DE | 4 | 1800.10 |
| DE | 5 | 1989.94 |
| DE | 6 | 1611.47 |
| DE | 7 | 2062.76 |
| FL | 1 | 1400.08 |
| FL | 2 | 1451.88 |
| FL | 3 | 1886.91 |
| FL | 4 | 1541.97 |
| FL | 5 | 1491.59 |
| FL | 6 | 1538.05 |
| FL | 7 | 1529.43 |
| GA | 1 | 2426.22 |
| GA | 2 | 2048.94 |
| GA | 3 | 2092.61 |
| GA | 4 | 2472.52 |
| GA | 5 | 2059.61 |
| GA | 6 | 2079.48 |
| GA | 7 | 1885.64 |
| GU | 7 | 1483.12 |
| HI | 1 | 1673.82 |
| HI | 2 | 1283.69 |
| HI | 3 | 1321.29 |
| HI | 4 | 1848.58 |
| HI | 5 | 1649.42 |
| HI | 6 | 1464.42 |
| HI | 7 | 1464.42 |
| IA | 1 | 1823.26 |
| IA | 2 | 1241.00 |
| IA | 3 | 1165.85 |
| IA | 4 | 1479.03 |
| IA | 5 | 1343.85 |
| IA | 6 | 1434.76 |
| IA | 7 | 1301.97 |
| ID | 1 | 956.95 |
| ID | 2 | 1688.02 |
| ID | 3 | 2504.72 |
| ID | 4 | 2510.55 |
| ID | 5 | 1392.08 |
| ID | 6 | 2230.52 |
| ID | 7 | 1315.32 |
| IL | 1 | 2322.06 |
| IL | 2 | 1521.42 |
| IL | 3 | 1533.54 |
| IL | 4 | 1993.73 |
| IL | 5 | 1478.86 |
| IL | 6 | 1835.36 |
| IL | 7 | 1522.20 |
| IN | 1 | 1042.08 |
| IN | 2 | 1241.58 |
| IN | 3 | 1298.56 |
| IN | 4 | 1580.42 |
| IN | 5 | 1512.47 |
| IN | 6 | 1582.15 |
| IN | 7 | 1391.91 |
| KS | 1 | 1330.02 |
| KS | 2 | 2132.75 |
| KS | 3 | 1699.21 |
| KS | 4 | 2066.43 |
| KS | 5 | 1837.87 |
| KS | 6 | 2663.32 |
| KS | 7 | 1910.31 |
| KY | 1 | 1996.76 |
| KY | 2 | 2339.08 |
| KY | 3 | 1993.62 |
| KY | 4 | 2712.68 |
| KY | 5 | 2437.63 |
| KY | 6 | 2567.52 |
| KY | 7 | 2261.82 |
| LA | 1 | 1559.27 |
| LA | 2 | 1675.22 |
| LA | 3 | 1731.62 |
| LA | 4 | 1817.26 |
| LA | 5 | 1587.92 |
| LA | 6 | 2051.50 |
| LA | 7 | 1666.98 |
| MA | 1 | 1335.57 |
| MA | 2 | 1619.84 |
| MA | 3 | 1404.43 |
| MA | 4 | 1389.55 |
| MA | 5 | 1377.12 |
| MA | 6 | 1543.68 |
| MA | 7 | 1610.56 |
| MD | 1 | 1963.05 |
| MD | 2 | 2684.51 |
| MD | 3 | 2686.33 |
| MD | 4 | 2997.66 |
| MD | 5 | 2700.78 |
| MD | 6 | 2829.75 |
| MD | 7 | 2558.74 |
| ME | 1 | 1418.26 |
| ME | 2 | 1563.93 |
| ME | 3 | 2347.69 |
| ME | 4 | 2694.69 |
| ME | 5 | 2426.83 |
| ME | 6 | 2304.48 |
| ME | 7 | 2153.56 |
| MI | 1 | 1117.48 |
| MI | 2 | 1305.62 |
| MI | 3 | 1196.14 |
| MI | 4 | 1435.20 |
| MI | 5 | 1230.84 |
| MI | 6 | 1360.35 |
| MI | 7 | 1227.71 |
| MN | 1 | 1613.47 |
| MN | 2 | 1652.03 |
| MN | 3 | 1470.40 |
| MN | 4 | 1865.70 |
| MN | 5 | 1463.86 |
| MN | 6 | 1640.23 |
| MN | 7 | 1318.35 |
| MO | 1 | 1539.53 |
| MO | 2 | 1745.38 |
| MO | 3 | 1939.02 |
| MO | 4 | 1956.37 |
| MO | 5 | 1807.58 |
| MO | 6 | 1823.52 |
| MO | 7 | 1724.75 |
| MP | 7 | 1483.12 |
| MS | 1 | 1559.27 |
| MS | 2 | 1704.64 |
| MS | 3 | 2008.57 |
| MS | 4 | 2346.50 |
| MS | 5 | 2058.47 |
| MS | 6 | 2151.04 |
| MS | 7 | 2068.00 |
| MT | 1 | 956.95 |
| MT | 2 | 1282.64 |

TABLE 4-continued

UPDATE MILEAGE LOOK-UP TABLE

| State | Zip Locality | Final Miles |
|---|---|---|
| MT | 3 | 1208.02 |
| MT | 4 | 1596.97 |
| MT | 5 | 1392.08 |
| MT | 6 | 2230.52 |
| MT | 7 | 1630.64 |
| NC | 1 | 1574.96 |
| NC | 2 | 1621.88 |
| NC | 3 | 1625.27 |
| NC | 4 | 1558.11 |
| NC | 5 | 1575.37 |
| NC | 6 | 1683.43 |
| NC | 7 | 1409.02 |
| ND | 1 | 1515.62 |
| ND | 2 | 1415.50 |
| ND | 3 | 1149.02 |
| ND | 4 | 1679.84 |
| ND | 5 | 1438.63 |
| ND | 6 | 1432.23 |
| ND | 7 | 1456.36 |
| NE | 1 | 1269.73 |
| NE | 2 | 1087.68 |
| NE | 3 | 1079.27 |
| NE | 4 | 1333.34 |
| NE | 5 | 1348.08 |
| NE | 6 | 1288.48 |
| NE | 7 | 1149.58 |
| NH | 1 | 1418.26 |
| NH | 2 | 1348.63 |
| NH | 3 | 1463.91 |
| NH | 4 | 1583.05 |
| NH | 5 | 1436.37 |
| NH | 6 | 1638.45 |
| NH | 7 | 1466.55 |
| NJ | 1 | 1296.28 |
| NJ | 2 | 1573.06 |
| NJ | 3 | 1888.12 |
| NJ | 4 | 2001.17 |
| NJ | 5 | 1191.23 |
| NJ | 6 | 1332.83 |
| NJ | 7 | 1260.33 |
| NM | 1 | 2943.53 |
| NM | 2 | 1951.06 |
| NM | 3 | 1834.20 |
| NM | 4 | 2980.27 |
| NM | 5 | 2368.07 |
| NM | 6 | 2875.31 |
| NM | 7 | 1752.88 |
| NV | 1 | 1380.88 |
| NV | 2 | 1433.45 |
| NV | 3 | 1360.49 |
| NV | 4 | 1776.14 |
| NV | 5 | 1369.45 |
| NV | 6 | 1804.62 |
| NV | 7 | 1220.30 |
| NY | 1 | 1385.56 |
| NY | 2 | 1822.65 |
| NY | 3 | 1888.12 |
| NY | 4 | 2001.17 |
| NY | 5 | 1616.29 |
| NY | 6 | 1773.74 |
| NY | 7 | 1616.57 |
| OH | 1 | 1303.60 |
| OH | 2 | 1426.96 |
| OH | 3 | 1168.74 |
| OH | 4 | 2011.73 |
| OH | 5 | 1243.44 |
| OH | 6 | 1937.37 |
| OH | 7 | 1372.57 |
| OK | 1 | 2112.93 |
| OK | 2 | 1970.50 |
| OK | 3 | 1583.15 |
| OK | 4 | 2142.48 |
| OK | 5 | 2134.95 |
| OK | 6 | 2666.83 |
| OK | 7 | 1941.04 |
| ON | 7 | 1483.12 |
| OR | 1 | 1290.17 |
| OR | 2 | 1401.47 |
| OR | 3 | 1575.53 |
| OR | 4 | 1670.23 |
| OR | 5 | 1439.28 |
| OR | 6 | 1423.45 |
| OR | 7 | 1544.29 |
| PA | 1 | 1818.83 |
| PA | 2 | 1422.47 |
| PA | 3 | 1379.61 |
| PA | 4 | 1566.14 |
| PA | 5 | 1476.00 |
| PA | 6 | 1568.76 |
| PA | 7 | 1338.45 |
| PR | 3 | 1483.12 |
| PR | 7 | 1483.12 |
| RI | 1 | 1483.12 |
| RI | 2 | 1483.12 |
| RI | 5 | 1483.12 |
| RI | 6 | 1483.12 |
| RI | 7 | 1379.00 |
| SC | 1 | 3105.56 |
| SC | 2 | 2543.41 |
| SC | 3 | 2527.49 |
| SC | 4 | 2425.91 |
| SC | 5 | 2573.69 |
| SC | 6 | 2730.64 |
| SC | 7 | 2458.53 |
| SD | 1 | 1203.13 |
| SD | 2 | 1157.69 |
| SD | 3 | 1203.30 |
| SD | 4 | 1563.26 |
| SD | 5 | 1474.27 |
| SD | 6 | 1432.23 |
| SD | 7 | 1249.04 |
| TN | 1 | 1675.55 |
| TN | 2 | 1785.01 |
| TN | 3 | 1660.02 |
| TN | 4 | 1723.65 |
| TN | 5 | 1818.94 |
| TN | 6 | 1965.45 |
| TN | 7 | 1696.79 |
| TX | 1 | 1642.74 |
| TX | 2 | 1766.24 |
| TX | 3 | 1619.07 |
| TX | 4 | 1954.60 |
| TX | 5 | 1738.27 |
| TX | 6 | 1831.68 |
| TX | 7 | 1500.61 |
| UT | 1 | 1541.59 |
| UT | 2 | 2280.45 |
| UT | 3 | 2025.40 |
| UT | 4 | 2160.06 |
| UT | 5 | 2194.22 |
| UT | 6 | 2322.54 |
| UT | 7 | 1580.50 |
| VA | 1 | 1475.79 |
| VA | 2 | 1792.64 |
| VA | 3 | 1954.60 |
| VA | 4 | 2192.27 |
| VA | 5 | 1689.88 |
| VA | 6 | 1956.93 |
| VA | 7 | 1678.53 |
| VT | 1 | 1418.26 |
| VT | 2 | 1348.63 |
| VT | 3 | 2626.03 |
| VT | 4 | 2575.36 |
| VT | 5 | 1436.37 |
| VT | 6 | 1638.45 |
| VT | 7 | 2066.08 |
| WA | 1 | 1290.17 |
| WA | 2 | 1401.47 |
| WA | 3 | 1575.53 |
| WA | 4 | 1462.90 |
| WA | 5 | 1439.28 |
| WA | 6 | 1423.45 |

TABLE 4-continued

UPDATE MILEAGE LOOK-UP TABLE

| State | Zip Locality | Final Miles |
|---|---|---|
| WA | 7 | 1307.38 |
| WI | 1 | 1050.09 |
| WI | 2 | 2105.45 |
| WI | 3 | 1807.89 |
| WI | 4 | 1763.28 |
| WI | 5 | 1585.15 |
| WI | 6 | 2034.03 |
| WI | 7 | 1610.20 |
| WV | 1 | 2756.06 |
| WV | 2 | 1479.96 |
| WV | 3 | 1884.93 |
| WV | 4 | 1670.23 |
| WV | 5 | 1603.53 |
| WV | 6 | 1802.25 |
| WV | 7 | 1728.80 |
| WY | 1 | 1670.87 |
| WY | 2 | 1354.22 |
| WY | 3 | 1577.46 |
| WY | 4 | 2000.25 |
| WY | 5 | 1474.27 |
| WY | 6 | 1432.23 |
| WY | 7 | 1547.65 |
| Missing | Missing | 1483.12 |

The other derived variables created are the Current Year (CURRYR) and Current Month (CURRMTH), as well as an automobiles age (AGE=CURRYR−MODELYR). Due to the fact that, in some embodiments, model years do not necessarily coincide exactly with calendar years, if the above calculation of AGE equals −1, the AGE is set to 0, and if the AGE equals CURRYR (the model year is missing or unknown for some reason), then the earliest year available from the event history is used as a proxy for MODELYR, and AGE is recalculated. As described above, in the example embodiment, six age categories (designated by AGE 1) are used:

If AGE is greater than or equal to 0 and less than or equal to 3 then set AGE 1=1
If AGE is greater than or equal to 4 and less than or equal to 5 then set AGE 1=2
If AGE is greater than or equal to 6 and less than or equal to 8 then set AGE 1=3
If AGE is greater than or equal to 9 and less than or equal to 10 then set AGE 1=4
If AGE is greater than or equal to 11 and less than or equal to 12 then set AGE 1=5
If AGE is greater than or equal to 13 then set AGE 1=6
ZIPLOC is set based on the current owner's zip locality:
If ZIPLOC1 equals 'B2' then set ZIPLOC=1
If ZIPLOC1 equals 'C1', 'C2', 'C3', 'C4' then set ZIPLOC=2
If ZIPLOC1 equals 'R0', 'R1', 'R2', 'R3', 'R4' then set ZIPLOC=3
If ZIPLOC1 equals 'R5', 'R6', 'R7', 'R8', 'R9' then set ZIPLOC=4
If ZIPLOC1 equals 'S0', 'S1', 'S2', 'S3', 'S4' then set ZIPLOC=5
If ZIPLOC1 equals 'S5', 'S6', 'S7', 'S8', 'S9' then set ZIPLOC=6
Else set ZIPLOC=7
the current owner's state is missing, STATE is coded to '00.' The maximum miles can be computed as the maximum of all event odometer readings. The corresponding event year (MAXEYR) and event month (MAXEMTH) of the maximum odometer reading should be passed to two new variables. Using STATE1 and ZIPLOC1, the table discussed above can give the value of UPMILES. Finally, if VALLOAN is greater than 0 AND VALMSRP is greater than 0, then MSRPRAT=VALLOAN/VALMSRP. Once these variables are known, the automobile or automobiles being scored can be filtered into the correct age groups, and scored as below:

1. SEGMENT 1: Age 0-3 Years
Select if AGE1=1
Recode and point assignment to FINMILE:

If AGE = 0 and FINMILE is blank then set FINMILE=14510.17
If AGE = 1 and FINMILE is blank then set FINMILE=29565.12
If AGE = 2 and FINMILE is blank then set FINMILE=48072.77
If AGE = 3 and FINMILE is blank then set FINMILE=64491.77
Compute FINMILE=FINMILE*−0.000005
Point assignment to TOTOWN1:

Compute TOTOWN1=TOTOWN1 * −0.0894
Recode and point assignment to HASSURED: autocheck assured If HASSURED = 'Y' then set HASSURED = 0.4319
Else set HASSURED = −0.4319
Recode and point assignment to NEGA1: (government use, police use, accident, theft)

Count GOVUSE = ECHEK01 to ECHEK30 ('5030')
Count POLICE = ECHEK01 to ECHEK30 ('5040')
Count ACCIDENT=ECHEK01 to ECHEK30 ('3000')
Count THEFT=ECHEK01 to ECHEK30 ('3090')
Recode GOVUSE POLICE ACCIDENT THEFT (1 thru hi=1).

If GOVUSE, POLICE, ACCIDENT or THEFT = 1 then set NEGA1=−0.4216
Else set NEGA1= 0.4216
Recode and point assignment to MAKETXT:

If MAKETXT = 'Aston Martin', 'Ferrari', 'Lotus', 'Hummer', 'BMW', 'Mini', 'Jaguar', 'Subaru', 'Rolls Royce', 'Bentley', 'Lexus', 'Lamborghini'
  then set MAKETXT = 0.2622
If MAKETXT = 'Infiniti', 'Mercedes-Benz', 'Cadillac', 'Buick', 'Volvo', 'Porsche', 'Saab'
  then set MAKETXT = 0.2243

If MAKETXT = 'Audi', 'Acura', 'Toyota', 'Scion', 'Lincoln', 'Honda', 'Chrysler', 'Volkswagen', 'Jeep', 'Land Rover'
   then set MAKETXT = 0.1613
If MAKETXT = 'Nissan', 'GMC', 'Oldsmobile', 'Chevrolet', 'Saturn', 'Pontiac', 'Dodge', 'Dodge Freightliner', 'Freightliner', 'Ford', 'Mercury'
   then set MAKETXT = −0.0022
If MAKETXT = 'Mazda', 'Isuzu', 'Mitsubishi', 'Plymouth', 'Hyundai'
   then set MAKETXT = −0.2109
If MAKETXT = 'Kia', 'Daewoo', 'Suzuki', 'Eagle'
then set MAKETXT = −0.4347
If MAKETXT is blanks then set MAKETXT = −0.0022
Recode and point assignment to VEHCLASS:

If VEHCLASS = 'Sport Car - Ultra Luxury', 'Sport Wagon - Mid Range', 'Sport Car - Premium', 'Upscale - Premium', 'Upscale - Near Luxury' 'Upscale - Luxury', 'Sport Car - Upper Premium', 'SUV - Large', 'SUV - Upper Mid Range', 'Mid Range Car - Premium'
   then set VEHCLASS = 0.3441
If VEHCLASS = 'SUV - Pickup', 'SUV - Lower Mid Range', 'CUV - Mid Range', 'Van - Mini', 'Pickup - Full Sized', 'Mid Range Car - Standard', 'SUV - Premium Large', 'CUV - Premium', 'Sport Wagon - Premium', 'Upscale - Ultra', 'Sport Wagon - Entry Level', 'Alt Power - Hybrid Car', 'SUV - Entry Level', 'CUV - Entry Level', 'Pickup - Small'
   then set VEHCLASS = 0.1067
If VEHCLASS = 'Mid Range Car - Lower', 'Van - Full Sized', 'Sport Car - Touring'
then set VEHCLASS = −0.1285
If VEHCLASS = 'Traditional Car', 'Small Car - Economy', 'Small Car - Budget'
   then set VEHCLASS = −0.3223
If VEHCLASS is blank then set VEHCLASS = 0.1067
Creation of SCORE for Vehicles 0 - 3 Years Old:

SCORE = (1.7137 + FINMILE + TOTOWN1 + HASSURED + NEGA1 + MAKETXT + VEHCLASS)
2. SEGMENT 2: Age 4-5 Years
Select if AGE1=2
Recode and point assignment to MSRPRAT:

If AGE = 4 and MSRPRAT is blank then set MSRPRAT=0.4771
If AGE = 5 and MSRPRAT is blank then set MSRPRAT=0.3901
Compute MSRPRAT=MSRPRAT* 1.0794
Recode and point assignment to FINMILE:

If AGE = 4 and FINMILE is blank then set FINMILE=80945.76
If AGE = 5 and FINMILE is blank then set FINMILE=96516.11
Compute FINMILE=FINMILE* −0.000006
Point assignment to TOTOWN1:

Compute TOTOWN1=TOTOWN1 * −0.1191
Recode and point assignment to HASSURED:

If HASSURED equals 'Y' then set HASSURED = 0.2872
Else set HASSURED equal to −0.2872
Create and point assignment to POS1:

Count LEASE = LEASE01 to LEASE10 ('Y')
Count EMISSION = ECHEK01 to ECHEK30 ('3030')
Recode LEASE EMISSION (1 thru hi=1)

If LEASE or EMISSION equals 1 then set then set POS1 = 0.0455
Else set POS1 = −0.0455
Create and point assignment to NEGB1:

Count ACCIDENT=ECHEK01 to ECHEK30 ('3000')
Count THEFT=ECHEK01 to ECHEK30 ('3090')
Count REPOSS=ECHEK01 to ECHEK30 ('5080')
Count TAXI=ECHEK01 to ECHEK30 ('5050')
Recode ACCIDENT THEFT REPOSS TAXI (1 thru hi=1)

If ACCIDENT, THEFT, REPOSS or TAXI = 1 then set NEGB1 = −0.1591
Else set NEGB1 = 0.1591
Recode and point assignment to MAKETXT:

If MAKETXT = 'Lotus', 'Rolls Royce', 'BMW', 'Mini', 'Ferrari', 'Volvo', 'Mercedes-Benz', 'Bentley', 'Lexus', 'Subaru'
   then set MAKETXT = 0.2640
If MAKETXT = 'Jaguar', 'Porsche', 'GMC', 'Audi', 'Lincoln', 'Saab', 'Cadillac', 'Buick'
   then set MAKETXT = 0.1283
If MAKETXT = 'Jeep', 'Honda', 'Infiniti', 'Acura', 'Toyota', 'Scion', 'Land Rover'
   then set MAKETXT = 0.1022

-continued

If MAKETXT = 'Chevrolet', 'Hummer', 'Ford', 'Oldsmobile', 'Isuzu', 'Chrysler', 'Volkswagen', 'Dodge', 'Dodge Freightliner', 'Freightliner', 'Saturn'
   then set MAKETXT = −0.0764
If MAKETXT = 'Nissan', 'Mercury', 'Mazda', 'Pontiac', 'Mitsubishi', 'Plymouth'
   then set MAKETXT = −0.1417
If MAKETXT = 'Daewoo', 'Eagle', 'Geo', 'Kia', 'Suzuki', 'Hyundai'
   then set MAKETXT = −0.2764
If MAKETXT = blank then set MAKETXT = 0.1022
Recode and point assignment to VEHCLASS:

If VEHCLASS = 'Alt Power - Hybrid Car', 'Alt Power - Hybrid Truck', 'Sport Car - Ultra Luxury', 'Sport Car - Upper Premium'
   then set VEHCLASS = 0.7330
If VEHCLASS = 'Upscale - Premium', 'Pickup - Full Sized', 'SUV - Large', 'Upscale - Luxury', 'Upscale - Near Luxury', 'SUV - Premium Large', 'CUV - Premium', 'SUV - Upper Mid Range'
   then set VEHCLASS = 0.1891
If VEHCLASS = 'SUV - Lower Mid Range', 'SUV - Mid Range', 'Van - Full Sized', 'Mid Range Car - Premium', 'Sport Car - Premium', 'SUV - Entry Level', 'CUV - Entry Level'
   then set VEHCLASS = 0.0594
If VEHCLASS = 'Pickup - Small', 'Sport Wagon - Entry Level', 'Traditional Car', 'Van - Mini', 'Mid Range Car - Standard'
   then set VEHCLASS = −0.1203
If VEHCLASS = 'Upscale - Ultra', 'Sport Car - Touring'
   then set VEHCLASS = −0.4122
If VEHCLASS = 'Mid Range Car - Lower', 'Small Car - Economy', 'Small Car - Budget'
   then set VEHCLASS = −0.4490
If VEHCLASS = blank then set VEHCLASS = 0.0594
Creation of SCORE for Vehicles 4 - 5 Years Old:

SCORE = (1.9333 + MSRPRAT + FINMILE + TOTOWN1 + HASSURED + POS1 + NEGB1 + MAKETXT + VEHCLASS)
3. SEGMENT 3: Age 6-8 Years
Select if AGE1=3
Recode and point assignment to MSRPRAT:

If AGE = 6 and MSRPRAT is blank then set MSRPRAT=0.3141
If AGE = 7 and MSRPRAT is blank then set MSRPRAT=0.2565
If AGE = 8 and MSRPRAT is blank then set MSRPRAT=0.2068
Compute MSRPRAT=MSRPRAT*2.3463
Recode and point assignment to FINMILE:

If AGE = 6 and FINMILE is blank then set FINMILE=111724.22
If AGE = 7 and FINMILE is blank then set FINMILE=123938.87
If AGE = 8 and FINMILE is blank then set FINMILE=136387.33
Compute FINMILE=FINMILE* −0.000006
Point assignment to TOTOWN1:

Compute TOTOWN1=TOTOWN1 * −0.1569
Recode and point assignment to HASSURED:

If HASSURED equals 'Y' then set HASSURED = 0.2865
Else set HASSURED equal to −0.2865
Create and point assignment to POS1:

Count LEASE = LEASE01 to LEASE10 ('Y')
Count EMISSION = ECHEK01 to ECHEK30 ('3030')
Recode LEASE EMISSION (1 thru hi=1)

If LEASE or EMISSION equals 1 then set then set POS1 = 0.1051
Else set POS1 = −0.1051
Create and point assignment to NEGC1:

Count ACCIDENT=ECHEK01 to ECHEK30 ('3000')
Count THEFT=ECHEK01 to ECHEK30 ('3090')
Count REPOSS=ECHEK01 to ECHEK30 ('5080')
Count TAXI=ECHEK01 to ECHEK30 ('5050')
Recode ACCIDENT THEFT REPOSS TAXI (1 thru hi=1)

If ACCIDENT, THEFT, REPOSS or TAXI equals 1 then set NEGC1 = −0.1652
Else set NEGC1 = 0.1652
Recode and point assignment to MAKETXT:

If MAKETXT = 'Lotus', 'Rolls Royce', 'Porsche', 'Ferrari', 'Hummer', 'Mercedes-Benz', 'Alfa Romeo', 'Jaguar', 'Bentley', 'BMW', 'Mini'
   then set MAKETXT= 0.3857
If MAKETXT = 'Volvo', 'Lexus', 'Land Rover', 'Cadillac', 'GMC', 'Honda', 'Jeep', 'Toyota', 'Scion'

-continued then set MAKETXT= 0.1595
If MAKETXT = 'Acura', 'Buick', 'Audi', 'Infiniti', 'Isuzu', 'Subaru', 'Lincoln', 'Saab',
'Chevrolet', 'Oldsmobile', 'Nissan', 'Volkswagen'
  then set MAKETXT= −0.0549
If MAKETXT = 'Ford', 'Suzuki', 'Chrysler', 'Saturn', 'Dodge', 'Dodge Freightliner',
'Freightliner', 'Kia', 'Mercury', 'Mazda', 'Pontiac', 'Mitsubishi' or 'Geo'
  then set MAKETXT= −0.1441
If MAKETXT = 'Plymouth', 'Eagle', 'Hyundai'
  then set MAKETXT= −0.3462
If MAKETXT is blank then set MAKETXT = −0.0549
Recode and point assignment to VEHCLASS:

If VEHCLASS is equal 'Sport Car - Ultra Luxury', 'Sport Car - Upper Premium',
'Upscale - Premium', 'SUV - Large', 'SUV - Premium Large', 'CUV - Premium',
'Pickup - Full Sized'
  then set VEHCLASS = 0.3360
If VEHCLASS is equal 'Upscale - Luxury', 'SUV - Lower Mid Range', 'CUV - Mid
Range', 'Upscale - Near Luxury', 'Van - Full Sized', 'SUV - Entry Level', 'CUV - Entry
Level'
  then set VEHCLASS = 0.1652
If VEHCLASS = 'Mid Range Car - Premium', 'Pickup - Small', 'Traditional Car',
'SUV - Upper Mid Range', 'Mid Range Car - Standard', 'Sport Car - Premium'
  then set VEHCLASS = −0.0474
If VEHCLASS = 'Van - Mini', 'Sport Car - Touring'
  then set VEHCLASS = −0.1117
If VEHCLASS = 'Mid Range Car - Lower', 'Small Car - Economy', 'Upscale - Ultra',
'Small Car - Budget'
  then set VEHCLASS = −0.3421
If VEHCLASS = blank then set VEHCLASS = −0.0474
Creation of SCORE for Vehicles 6 - 8 Years Old:
SCORE = (1.4112+MSRPRAT + FINMILE + TOTOWN1 + HASSURED +
POS1 + NEGC1 + MAKETXT + VEHCLASS)

4. SEGMENT 4: Age 9-10 Years
Select if AGE1=4
Recode and point assignment to MSRPRAT:

If AGE = 9 and MSRPRAT is blank then set MSRPRAT= 0.1949
If AGE = 10 and MSRPRAT is blank then set MSRPRAT= 0.1749
Compute MSRPRAT=MSRPRAT*2.0448
Recode and point assignment to FINMILE:

If AGE = 9 and FINMILE is blank then set FINMILE = 147029.5
If AGE = 10 and FINMILE is blank then set FINMILE = 157867.1
Compute FINMILE=FINMILE* −0.000004
Point assignment to TOTOWN1:

Compute TOTOWN1=TOTOWN1 * −0.1717
Recode and point assignment to HASSURED:

If HASSURED equals 'Y' then set HASSURED = 0.3086
Else set HASSURED equal to −0.3086
Create and point assignment to POS1:

Count LEASE = LEASE01 to LEASE10 ('Y')
Count EMISSION = ECHEK01 to ECHEK30 ('3030')
Recode LEASE EMISSION (1 thru hi=1)
If LEASE or EMISSION equals 1 then set then set POS1 = 0.1495
Else set POS1 = −0.1495
Create and point assignment to NEGD1:

Count ACCIDENT=ECHEK01 to ECHEK30 ('3000')
Count THEFT=ECHEK01 to ECHEK30 ('3090')
Count REPOSS=ECHEK01 to ECHEK30 ('5080')
Count TAXI=ECHEK01 to ECHEK30 ('5050')
Recode ACCIDENT THEFT REPOSS TAXI (1 thru hi=1)
If ACCIDENT, THEFT, REPOSS or TAXI equals 1 then set NEGD1 = −0.1971
Else set NEGD1 = 0.1971
Create and point assignment to NEGD2:

Count POLICE=ECHEK01 to ECHEK30 ('5040')
Count GOVUSE=ECHEK01 to ECHEK30 ('5030')
Count LIVERY=ECHEK01 to ECHEK30 ('5020')
Recode POLICE GOVUSE LIVERY (1 thru hi=1)
If POLICE, GOVUSE or LIVERY equals 1 then set NEGD1 = −0.3911
Else set NEGD1 = 0.3911
Recode and point assignment to MAKETXT:

If MAKETXT = 'Aston Martin', 'Ferrari', 'Hummer', 'Lamborghini', 'Rolls Royce',
'Porsche', 'Mercedes-Benz', 'Bentley', 'Lexus', 'BMW', 'Mini'
  then set MAKETXT = 0.6189

-continued

If MAKETXT = 'Volvo', 'Jeep', 'Lotus', 'Jaguar', 'Acura', 'Honda', 'Alfa Romeo', 'Toyota', 'Scion', 'T.C.'
   then set MAKETXT = 0.3908
If MAKETXT = 'Land Rover', 'Cadillac', 'GMC', 'Infiniti', 'Buick'
   then set MAKETXT = 0.0264
If MAKETXT = 'Audi', 'Saab', 'Suzuki', 'Lincoln', 'Nissan', 'Chevrolet', 'Mazda', 'Subaru', 'Chrysler', 'Oldsmobile', 'Isuzu', 'Daihatsu', 'Ford', 'Dodge', 'Dodge Freightliner', 'Freightliner', 'Saturn', 'Volkswagen'
   then set MAKETXT = −0.2242
If MAKETXT = 'Mercury', 'Mitsubishi', 'Peugeot'
   then set MAKETXT = −0.3677
If MAKETXT = 'Pontiac', 'Geo', 'Plymouth', 'Eagle', 'Hyundai', 'Sterling', 'Yugo'
   then set MAKETXT = −0.4442
If MAKETXT is blank then set MAKETXT = 0.0264
Recode and point assignment to VEHCLASS:

If VEHCLASS = 'Upscale - Ultra', 'Sport Car - Ultra Luxury', 'Sport Car - Upper Premium', 'SUV - Premium Large', 'CUV - Premium', 'SUV - Large', 'Pickup - Full Sized', 'Upscale - Premium'
   then set VEHCLASS = 0.4292
If VEHCLASS = 'Upscale - Near Luxury', 'Upscale - Luxury', 'SUV - Entry Level', 'CUV - Entry Level'
   then set VEHCLASS = 0.2013
If VEHCLASS = 'SUV - Upper Mid Range', 'Van - Full Sized', 'SUV - Lower Mid Range', 'CUV - Mid Range', 'Sport Car - Premium'
   then set VEHCLASS = 0.0728
If VEHCLASS = 'Mid Range Car - Premium', 'Traditional Car', 'Pickup - Small'
   then set VEHCLASS = −0.0625
If VEHCLASS = 'Mid Range Car - Standard', 'Sport Car - Touring'
   then set VEHCLASS = −0.1860
If VEHCLASS = 'Van - Mini', 'Mid Range Car - Lower', 'Small Car - Economy', 'Small Car - Budget'
   then set VEHCLASS = −0.4548
If VEHCLASS = blank then set VEHCLASS = 0.0728
Creation of SCORE for Vehicles 9 - 10 Years Old:

SCORE = (0.6321 + MSRPRAT + FINMILE + TOTOWN1 + HASSURED + POS1 + NEGD1 + NEGD2 + MAKETXT + VEHCLASS)

5. SEGMENT 5: Age 11-12 Years
Select if AGE1=5
Recode and point assignment to MSRPRAT:

If AGE = 11 and MSRPRAT is blank then set MSRPRAT= 0.1446
If AGE = 12 and MSRPRAT is blank then set MSRPRAT= 0.1248
Compute MSRPRAT=MSRPRAT*3.7191
Recode and point assignment to FINMILE:

If AGE = 11 and FINMILE is blank then set FINMILE = 169523.67
If AGE = 12 and FINMILE is blank then set FINMILE = 179620.44
Compute FINMILE=FINMILE* −0.000003
Point assignment to TOTOWN1:

Compute TOTOWN1=TOTOWN1 * −0.3131
Recode and point assignment to HASSURED:

If HASSURED equals 'Y' then set HASSURED = 0.2076
Else set HASSURED equal to −0.2076
Create and point assignment to POS1:

Count LEASE = LEASE01 to LEASE10 ('Y')
Count EMISSION = ECHEK01 to ECHEK30 ('3030')
Recode LEASE EMISSION (1 thru hi=1)

If LEASE or EMISSION equals 1 then set then set POS1 = 0.2573
Else set POS1 = −0.2573
Create and point assignment to NEGE1:

Count ACCIDENT=ECHEK01 to ECHEK30 ('3000')
Count THEFT=ECHEK01 to ECHEK30 ('3090')
Count REPOSS=ECHEK01 to ECHEK30 ('5080')
Count TAXI=ECHEK01 to ECHEK30 ('5050')
Recode ACCIDENT THEFT REPOSS TAXI (1 thru hi=1)

If ACCIDENT, THEFT, REPOSS or TAXI equals 1 then set NEGE1 = −0.2057
Else set NEGE1 = 0.2057
Recode and point assignment to MAKETXT:

If MAKETXT = 'Ferrari', 'Lamborghini', 'Lotus', 'Rolls Royce', 'Alfa Romeo', 'Bentley', 'Porsche', 'Mercedes-Benz', 'Lexus', 'BMW', 'Mini', 'Laforza', 'Jaguar', 'Land Rover', 'Volvo', 'Jeep'

-continued

```
    then set MAKETXT = 0.6174
If MAKETXT = 'GMC', 'Infiniti', 'Toyota', 'Scion', 'Acura'
    then set MAKETXT = 0.1136
If MAKETXT = 'Honda', 'Cadillac', 'Sterling' 'Isuzu', 'Daihatsu', 'Mazda', 'Chevrolet',
'Buick', 'Ford', 'Nissan' 'Lincoln', 'Volkswagen', 'Oldsmobile', 'Suzuki', 'Audi', 'T.C. ',
'Saab', 'Avanti'
    then set MAKETXT = −0.0944
If MAKETXT = 'Mitsubishi', 'Dodge', 'Dodge Freightliner', 'Freightliner', 'Chrysler',
'Geo', 'Subaru'
    then set MAKETXT = −0.1559
If MAKETXT = 'Mercury', 'Peugeot', 'Pontiac', 'Plymouth', 'Hyundai', 'Merkur',
'Eagle', 'AMC', 'Yugo', 'GMC Canada'
    then set MAKETXT = −0.4807
If MAKETXT is blank then set MAKETXT = −0.0944
Recode and point assignment to VEHCLASS:

If VEHCLASS = 'Sport Car - Ultra Luxury', 'Upscale - Ultra', 'SUV - Premium Large',
' CUV - Premium', 'Upscale - Premium', 'Sport Car - Upper Premium', 'Pickup - Full
Sized', 'SUV - Lower Mid Range', 'CUV - Mid Range', 'SUV - Large'
    then set VEHCLASS = 0.3976
If VEHCLASS = 'SUV - Entry Level', 'CUV - Entry Level', 'Upscale - Luxury', 'Van -
Full Sized', 'Pickup - Small', 'Sport Car - Premium', 'Upscale - Near Luxury'
    then set VEHCLASS = 0.1455
If VEHCLASS = 'Traditional Car', 'Mid Range Car - Premium', 'Sport Car - Touring'
    then set VEHCLASS = 0.0066
If VEHCLASS = 'Mid Range Car - Standard', 'Van - Mini'
    then set VEHCLASS = −0.1662
If VEHCLASS = 'Mid Range Car - Lower', 'Small Car - Budget', 'Small Car -
Economy', 'Sport Wagon - Entry Level'
    then set VEHCLASS = −0.3835
If VEHCLASS = blank then set VEHCLASS = 0.0066
Creation of SCORE for Vehicles 11-12 Years Old:

SCORE = (0.5500 + MSRPRAT + FINMILE + TOTOWN1 + HASSURED + POS1 +
NEGE1 + MAKETXT + VEHCLASS)
6. SEGMENT 6: Age 13+ Years
Select if AGE1=6
Recode and point assignment to MSRPRAT:

If AGE = 13 and MSRPRAT is blank then set MSRPRAT= 0.1024
If AGE = 14 and MSRPRAT is blank then set MSRPRAT= 0.0884
If AGE = 15 and MSRPRAT is blank then set MSRPRAT= 0.0727
If AGE >= 16 and MSRPRAT is blank then set MSRPRAT= 0.0001
Compute MSRPRAT=MSRPRAT*3.7223
Recode and point assignment to FINMILE:

If AGE = 13 and FINMILE is blank then set FINMILE = 188582.78
If AGE = 14 and FINMILE is blank then set FINMILE = 194064.37
If AGE = 15 and FINMILE is blank then set FINMILE = 200533.11
If AGE = 16 and FINMILE is blank then set FINMILE = 208003.40
If AGE = 17 and FINMILE is blank then set FINMILE = 213229.71
If AGE = 18 and FINMILE is blank then set FINMILE = 212545.77
If AGE = 19 and FINMILE is blank then set FINMILE = 222148.95
If AGE >= 20 and FINMILE is blank then set FINMILE = 221612.97
Compute FINMILE=FINMILE* −0.000001
Point assignment to TOTOWN1:

Compute TOTOWN1=TOTOWN1 * −0.3849
Recode and point assignment to HASSURED:

If HASSURED equals 'Y' then set HASSURED = 0.2198
Else set HASSURED equal to −0.2198
Create and point assignment to POS1:

Count LEASE = LEASE01 to LEASE10 ('Y')
Count EMISSION = ECHEK01 to ECHEK30 ('3030')
Recode LEASE EMISSION (1 thru hi=1)

If LEASE or EMISSION equals 1 then set then set POS1 = 0.2261
Else set POS1 = −0.2261
Create and point assignment to ACCIDENT Count ACCIDENT=ECHEK01 to ECHEK30 ('3000')
Recode ACCIDENT (1 thru hi=1)
If ACCIDENT = 1 then set ACCIDENT = −0.2545
Else set ACCIDENT= 0.2545
Recode and point assignment to MAKETXT:

If MAKETXT = 'Lamborghini', 'Saturn', 'Ferrari', 'Lotus', 'Rolls Royce', 'Land Rover',
'Porsche', 'Suzuki', 'Mercedes-Benz', 'Alfa Romeo', 'Avanti', 'Bentley', 'Triumph',
```

-continued

```
'TVR', 'Mitsubishi', 'BMW', 'Mini', 'Jaguar', 'Aston Martin'
    then set MAKETXT = 0.4430
If MAKETXT = 'DeLorean', 'Jeep', 'Fiat', 'GMC', 'Bertone', 'Toyota', 'Scion', 'Lexus',
'Acura', 'Hyundai', 'Volvo'
    then set MAKETXT = 0.2180
If MAKETXT = 'Maserati', 'Isuzu', 'Mazda'
    then set MAKETXT = 0.0573
If MAKETXT = 'Chevrolet', 'Ford', 'Nissan', 'Honda'
    then set MAKETXT = −0.0464
If MAKETXT = 'Volkswagen', 'Sterling', 'Merkur', 'Cadillac', 'Dodge', 'Dodge
Freightliner', 'Freightliner',
    then set MAKETXT = −0.1173
If MAKETXT = 'Lincoln', 'Peugeot', 'Oldsmobile', 'Buick', 'Saab', 'Subaru', 'Chrysler'
    then set MAKETXT = −0.2106
If MAKETXT = 'Mercury', 'Audi', 'Pontiac', 'Eagle', 'Plymouth', 'AMC', 'Renault',
'Geo', 'GMC Canada', 'Lancia', 'Daihatsu', 'Yugo'
    then set MAKETXT = −0.3440
If MAKETXT is blank then set MAKETXT = 0.0573
Recode and point assignment to VEHCLASS:

If VEHCLASS = 'Upscale - Ultra', 'SUV - Premium Large', 'CUV - Premium',
'Sport Car - Upper Premium', 'Upscale - Premium', 'Sport Car - Ultra Luxury', 'Pickup
- Full sized', 'SUV - Lower Mid Range', 'CUV - Mid Range', 'Sport Car - Premium',
'Pickup - Small', 'SUV - Large', 'SUV - Entry Level', CUV - Entry Level'
    then set VEHCLASS = 0.4218
If VEHCLASS = 'Van - Full Sized', 'Upscale - Luxury'
    then set VEHCLASS = 0.2526
If VEHCLASS = 'Sport Car - Touring', 'Small Car - Budget', 'Upscale - Near Luxury',
'Mid Range Car - Premium'
    then set VEHCLASS = −0.0788
If VEHCLASS = 'Mid Range Car - Standard', 'Traditional Car', 'Van - Mini',
'Small Car - Economy'
    then set VEHCLASS = −0.2137
If VEHCLASS = 'Mid Range Car - Lower', 'Sport Wagon - Entry Level'
    then set VEHCLASS = −0.3819
If VEHCLASS = blank then set VEHCLASS = −0.0788
Creation of SCORE for Vehicles 13+ Years Old:

SCORE = (0.0171 + MSRPRAT + FINMILE + TOTOWN1 + HASSURED +
POS1 + ACCIDENT + MAKETXT + VEHCLASS)
```

As shown in the above representative embodiment, the estimated/actual mileage and other factors receive a weighting based on the statistical analysis of a sample set. In the detailed example described here, for the first age class, the number of owners is factored at a weight of −0.0894. If a vehicle is AutoCheck assured, then it gets a 0.4319 factor value; alternatively it gets a −0.4319 factor value. If there has been any record of government or police use, or an accident or theft reported for the vehicle, another factor (NEGA1) is given a value of −0.4216 and, if not, a value of 0.4216. Next, different makes of cars are assigned various factor values (MAKETXT). Typically high-end and well-made cars obtain greater values, while more budget cars may receive lesser values. A similar determination of the vehicle class is also a factor (VEHCLASS). To generate a score, the previously determined factors are then summed with 1.7137. This score will be a number between 0.0 and 1.00, inclusive. This may represent a probability of the vehicle being on the road in five more years. In an embodiment, the score reported to the end user may be multiplied by 100 to give a more recognizable score, such as a percentage. A similar process is used with the other age classes, although the weightings are different as can be seen.

Sample Uses

Although providing a vehicle score according to the present disclosure is useful in and of itself, there are a number of additional uses that may be helpful to users, whether they be vehicle owners, insurance companies, dealerships, and the like. First, it may be helpful to provide an embodiment to plot a vehicle's score over time. For example, data from the first year of the vehicle's life may be used to find a score as of a year from its original sale. Similarly data from the first and second years could be used to determine a score at the end of the second year, and so on. This data may be plotted on a chart or graph to show the decline in score over time. If restoration or repair work is done and factored into the score, such a score may also increase. Graphing multiple scores may also show the effect of various owners on a vehicle's score, if the timing of ownership is plotted as well.

Additionally, in one embodiment, it is possible to project a score into the future, such as by estimating mileage and likely events in future months and/or assuming similar trending in usage and event history as in a previous time frame. This can help show a vehicle owner when his or her car should best be replaced, the length of time it is likely to last, or other useful information. In another embodiment, such score predicting considers different possible usage and event scenarios (e.g., conservative, moderate, and heavy usage) to predict a range of future scoring. As predictions go farther into the future, the possible score estimations are likely to expand into a general cone shape from the present calculated score. This can help show users best-, worst-, and likely-case scenarios.

Furthermore, in one embodiment, a score may be used as a factor in providing individualized valuations for used cars. This can be particularly useful to user car dealers or interactive websites, such as Kelley Blue Book online (http://www.kbb.com).

Alternatives

One embodiment of the system and method described herein provides a score generator system that generates an automated vehicle specific valuation of a used car based on the physical and historical attributes of that vehicle. This score may indicate the likelihood that the vehicle will be on the road in a specific period of time. The score may give an absolute percentage of such likelihood or it may give a value relative to all other used vehicles in a database, all other used vehicles of the same make/model/year, or a certain subset of the vehicles in a database. In one embodiment, the score generator system includes a data link module for linking vehicle data and filter module for applying a multi-level filters that process the linked vehicle data.

Although the foregoing has been described in terms of certain preferred embodiments, other embodiments will be apparent to those of ordinary skill in the art from the disclosure herein. For example, a vehicle score may indicate the likelihood of a vehicle being on the road for another X number of months or years. Although X was discussed as five years in an example above, it would be obvious to vary this between three and eight years or any other period desired. Similarly, scoring may be based on a car holding up for another Y miles, where Y may be, for example, 36,000 miles, 50,000 miles, or 100,000 miles. The scoring discussed above has also been referred to as numerical, but a score could be configured as, for example, a set of stars or a grade, such as the A to F scale typical on elementary school report cards; pluses and minuses may be included to provide more precise grading as well. Additional elements may include actual wholesale or retail prices, or the actual "popularity" of the vehicle make/model/year combination. Different markets that are served or might be served may get different representations of the same information, or have the information presented in different ways.

The present systems and methods may also be accessed by any of a number of means, such as through the Internet as already explained or computer to computer transfer, through interactive television services, stand-alone or networked kiosks, automated telephone services and the like. Scores may be generated or retrieved individually or in batch in various embodiments. Although much of this disclosure discusses individual user access, it is understood that lenders, dealers, auctioneers, and others involved or interested in vehicles, particularly the used vehicle market, may also utilize this system. Moreover, the described embodiments have been presented by way of example only, and are not intended to limit the scope of the disclosure. Indeed, the novel systems and methods described herein may be embodied in a variety of other forms without departing from the spirit thereof. Accordingly, other combinations, omissions, substitutions, and modifications will be apparent to the skilled artisan in view of the disclosure herein. Thus, the present disclosure is not limited by the preferred embodiments, but is defined by reference to the appended claims. The accompanying claims and their equivalents are intended to cover forms or modifications as would fall within the scope and spirit of the disclosure.

What is claimed is:

1. A vehicle scoring system, comprising:
  a Computer system having a processor that supports operation of a software application;
  a data module, accessed on the computer system, including a plurality of vehicle data records obtained from at least one third party information database, in communication with the computer system, wherein the third party information database comprises at least one of title information database, registration information database, Department of Motor Vehicle (DMV) records database, auction records database, and accident records database;
  a filter module, executed on the computer system comprising:
    a first filter for obtaining relevant vehicle-related data from the data storage module's plurality of vehicle data records, the vehicle-related data comprising a plurality of factors relevant to a likelihood that a vehicle will be operation in a specific period of time;
    a second filter for comparing the obtained vehicle-related data of a specific vehicle to the obtained vehicle-related data of comparison vehicles and assigning a numerical value to each of the factors comprising the relevant vehicle-related data; and
    a third filter for weighting and combining the numerical values of the relevant data into a vehicle score for the specific vehicle, wherein weighting comprises applying a weight to each of the plurality of factors, the weight based on a relationship between each of the factors and the likelihood that the vehicle will be operational in a specific number of years, said relationship determined by a modeling technique applied to the plurality of data records,
    wherein combining comprises adding the weighted numerical values and wherein the score comprises a numerical value indicative of a likelihood that the specific vehicle will be operational in a specific period of time as compared to the set of comparison vehicles, expressed as a number between 0 and 100; and
  an output module for reporting the vehicle score to a user;
  wherein the computer system is capable of accepting, from a user, only a standard vehicle identification number relating to the specific vehicle and communicating the vehicle identification number to the filter module; and
  wherein the first filter bases its obtaining of relevant data on the vehicle identification number of the specific vehicle.

2. The vehicle scoring system of claim 1, wherein the output module comprises a web server.

3. The vehicle scoring system of claim 1, wherein the data storage module comprises a plurality of databases.

4. The vehicle scoring system of claim 3, further comprising:
  a data link module for linking data from the plurality of databases that is associated with at least the vehicle identifier; and
  wherein the processor is capable of operating the data link module.

5. The vehicle scoring system of claim 1, further comprising:
  a modeling module for providing the filter module with at least one of the first filter, the second filter and the third filter.

6. The vehicle scoring system of claim 5, wherein the modeling module uses at least a portion of the plurality of vehicle records in the data storage module to determine what types of data are relevant to the vehicle score.

7. The vehicle scoring system of claim 5, wherein the modeling module uses at least a portion of the plurality of vehicle records in the data storage module to determine relative values of different types of data relevant to the vehicle score.

8. The vehicle scoring system of claim 1, wherein the score is expressed as a number between 0 and 10.

9. The vehicle scoring system of claim 1, wherein the score is expressed as a percentage value between 0% and 100%.

10. A vehicle scoring system, comprising:
a computer system having a processor that supports operation of a software application;
a data storage module, accessed on the computer system, including a plurality of vehicle data records obtained from at least one third party information database, in communication with the computer system, wherein the third party information database comprises at least one of title information database, registration information database, Department of Motor Vehicle (DMV) records database, auction records database, and accident records database;
a filter module, executed on the computer system, comprising:
   a first filter for obtaining relevant vehicle-related data from the plurality of vehicle data records, the vehicle-related data comprising a plurality of factors relevant to a likelihood that a vehicle will be operational in a specific period of time, the vehicle-related data based on the vehicle identification number for a specific vehicle;
   a second filter for comparing the obtained vehicle-related data of the specific vehicle to the obtained vehicle-related data of comparison vehicles and assigning a numerical value to each of the factors comprising the relevant vehicle-related data; and
   a third filter for weighting and combining the numerical values of the relevant data into a vehicle score for the specific vehicle, wherein weighting comprises applying a weight determined by a modeling technique applied to the plurality of data records, wherein combining comprises adding the weighted numerical values and wherein the score comprises a numerical value indicative of a likelihood that the specific vehicle will be operational in a specific period of time, expressed as a number between 0 and 100; and
an output module for reporting the vehicle score to a user.

11. The vehicle scoring system of claim 10, wherein the computer system is capable of accepting, from a user, a standard vehicle identification number relating to the specific vehicle and communicating the vehicle identification number to the filter module.

* * * * *

UNITED STATES PATENT AND TRADEMARK OFFICE
CERTIFICATE OF CORRECTION

| | | |
|---|---|---|
| PATENT NO. | : 8,005,759 B2 | Page 1 of 1 |
| APPLICATION NO. | : 11/893609 | |
| DATED | : August 23, 2011 | |
| INVENTOR(S) | : Edith Hirtenstein and David Nemtuda | |

It is certified that error appears in the above-identified patent and that said Letters Patent is hereby corrected as shown below:

At column 7, line 42, please delete "embodies", and insert -- embodied --, therefor.

At column 35, line 58, Claim 1, please delete "Computer", and insert -- computer --, therefor.

At column 35, line 60, Claim 1, after "data" insert -- storage --, therefor.

At column 36, line 1, Claim 1, please delete "system", and insert -- system, --, therefor.

At column 36, line 7, Claim 1, please delete "operation", and insert -- operational --, therefor.

Signed and Sealed this
Twelfth Day of June, 2012

David J. Kappos
*Director of the United States Patent and Trademark Office*